(12) United States Patent
Henderson et al.

(10) Patent No.: US 12,099,929 B2
(45) Date of Patent: *Sep. 24, 2024

(54) NAME AND FACE MATCHING

(71) Applicant: The MITRE Corporation, McLean, VA (US)

(72) Inventors: John C. Henderson, Somerville, MA (US); Lucy R. Chai, Acton, MA (US); Jeffrey Zarrella, Denver, CO (US); Abigail S. Gertner, Arlington, MA (US); Keith J. Miller, Washington, DC (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,072

(22) Filed: Jun. 5, 2023

(65) Prior Publication Data

US 2023/0306264 A1    Sep. 28, 2023

Related U.S. Application Data

(63) Continuation of application No. 17/181,707, filed on Feb. 22, 2021, now Pat. No. 11,669,739, which is a
(Continued)

(51) Int. Cl.
*G06N 3/08* (2023.01)
*G06F 18/2135* (2023.01)
(Continued)

(52) U.S. Cl.
CPC .......... *G06N 3/08* (2013.01); *G06F 18/21355* (2023.01); *G06V 10/82* (2022.01);
(Continued)

(58) Field of Classification Search
CPC .......... G06N 3/08; G06N 3/044; G06N 3/045; G06N 20/10; G06F 18/21355;
(Continued)

(56) References Cited

U.S. PATENT DOCUMENTS 7,010,751 B2    3/2006    Shneiderman
8,559,682 B2    10/2013   Zhang et al.
(Continued)

OTHER PUBLICATIONS

Berg, Tamara L. et al., (2004) "Names and Faces in the News," Proceedings of the 2004 IEEE Computer Society Conference on Computer Vision and Pattern Recognition; 7 pages.
(Continued)

*Primary Examiner* — Huy C Ho
(74) *Attorney, Agent, or Firm* — Morrison & Foerster LLP

(57) ABSTRACT

Described are methods, systems, and computer-program product embodiments for selecting a face image based on a name. In some embodiments, a method includes receiving the name. Based on the name, a name vector is selected from a plurality of name vectors in a dataset that maps a plurality of names to a plurality of corresponding name vectors in a vector space, where each name vector includes representations associated with a plurality of words associated with each name. A plurality of face vectors corresponding to a plurality of face images is received. A face vector is selected from the plurality of face vectors based on a plurality of similarity scores calculated for the plurality of corresponding face vectors, where for each name vector, a similarity score is calculated based on the name vector and each face vector. The face image is output based on the selected face vector.

28 Claims, 12 Drawing Sheets

Related U.S. Application Data continuation of application No. 16/042,958, filed on Jul. 23, 2018, now Pat. No. 10,963,677.

(51) Int. Cl.
  *G06V 10/82* (2022.01)
  *G06V 30/19* (2022.01)
  *G06V 40/16* (2022.01)

(52) U.S. Cl.
  CPC ...... *G06V 30/19173* (2022.01); *G06V 40/172* (2022.01); *G06V 40/179* (2022.01)

(58) Field of Classification Search
  CPC ............. G06V 10/82; G06V 30/19173; G06V 40/172; G06V 40/179
  USPC .......................................................... 382/118
  See application file for complete search history.

(56) References Cited

U.S. PATENT DOCUMENTS

| | | | |
|---|---|---|---|
| 8,605,956 B2 | 12/2013 | Ross et al. | |
| 8,897,505 B2 | 11/2014 | Gokturk et al. | |
| 10,963,677 B2 | 3/2021 | Henderson et al. | |
| 11,080,316 B1* | 8/2021 | Das | G06F 16/434 |
| 2011/0116690 A1* | 5/2011 | Ross | G06V 10/763 |
| | | | 382/118 |
| 2013/0121584 A1* | 5/2013 | Bourdev | G06V 40/171 |
| | | | 382/218 |
| 2013/0216107 A1 | 8/2013 | Huang et al. | |
| 2015/0347826 A1 | 12/2015 | Dugan et al. | |
| 2016/0171291 A1 | 6/2016 | Papakipos et al. | |
| 2017/0147905 A1 | 5/2017 | Huang et al. | |
| 2019/0156122 A1 | 5/2019 | Lu | |

OTHER PUBLICATIONS

Chellappa, Rama et al. (2010) "Face Recognition by Computers and Humans," Computer 43, No. 2, IEEE; 10 pages.

Chen, Zetao et al. (2014) "Convolutional Neural Network-based Place Recognition," arXiv preprint arXiv:1411.1509; 8 pages.

Henderson et al. U.S. Office Action mailed Jul. 20, 2022 directed to U.S. Appl. No. 17/181,707; 10 pages.

Henderson et al., U.S. Office Action dated Jul. 20, 2020 directed to U.S. Appl. No. 16/042,958; 27 pages.

Henderson et al., U.S. Office Action mailed Jan. 9, 2020 directed to U.S. Appl. No. 16/042,958; 25 pages.

Miller, Tamara Lee et al. (2007) "Names and Faces," Technical Report No. UCB/EECS-2007-12, Electrical Engineering and Computer Sciences University of California at Berkeley; 34 pages.

Rassadin, Alexandr et al. (2017) "Group-level Emotion Recognition using Transfer Learning from Face Identification," arXiv preprint arXiv:1709,01688; 5 pages.

\* cited by examiner

NAME AND FACE MATCHING

CROSS REFERENCE TO RELATED APPLICATIONS

This application is a continuation of U.S. application Ser. No. 17/181,707, filed Feb. 22, 2021, which is a continuation of U.S. application Ser. No. 16/042,958 filed Jul. 23, 2018, the entire contents of each of which are incorporated herein by reference.

FIELD OF THE DISCLOSURE

This disclosure relates generally to systems and methods for matching names and faces and, more specifically, to selecting a name based on a face image or vice versa.

BACKGROUND OF THE DISCLOSURE

Current facial recognition systems rely on comparisons between an unknown face image with a collection of known face images corresponding to known persons to identify the person in the unknown face image. For example, DeepFace, a deep learning facial recognition system developed by Facebook, is capable of determining whether two images contain the same face with 97% accuracy. Such facial recognition systems, however, require that the person shown in the unknown face image be known to the system and whose face is stored in the collection of known face images.

In 2017, researchers from the Hebrew University of Jerusalem have discovered that a person's name may be reflected in his facial appearance, a phenomenon dubbed 'The Dorian Gray' effect, after Oscar Wilde's eponymous hero. In their experiments, they found that participants were able to correctly select the correct names to match corresponding face images at a rate better than random chance. In further experiments, the researchers trained deep convolutional neural networks (i.e., an example of a machine-learning algorithm) on a set of almost 100,000 portrait images to achieve an average matching accuracy of 59% compared to the expected accuracy of 50% based on random guess. Therefore, current facial recognition systems may be further improved by matching faces with names using the 'Dorian Gray' effect, which does not require that the person in a face image be known to the system before selecting a likely name for that person. The 59% accuracy achieved by the researches, however, is far too low to be useful and needs to be improved.

SUMMARY OF THE DISCLOSURE

As described above, current facial recognition systems may be enabled to select likely names for face images of unknown persons by implementing deep convolutional neural networks. There is a need, however, for methods, systems, and techniques to improve upon the 59% accuracy achieved using the deep convolutional neural networks alone. To address this need, an improved system can be configured to apply a dataset that maps a plurality of names to a plurality of corresponding name vectors in a vector space, where each name vector includes representations associated with a plurality of words associated with each name. In some embodiments, a name vector can be a positional vector in the vector space. In some embodiments, the system can be configured to perform word embedding to map the plurality of names to the plurality of corresponding name vectors. By using this dataset along with the application of a matching function to compare name vectors with face vectors corresponding to face images, the system disclosed herein achieved an average name-face matching accuracy between 72% and 80.5% in A/B testing depending on the matching function being applied and parameters chosen for the matching function. This accuracy vastly exceeds the expected accuracy of 50% were the system to randomly select one of two names (i.e., A or B) for the face image where one name (e.g., name A) is a correct name and the other name (e.g., name B) is an incorrect name.

In some embodiments, a system can be configured to select a name for a person shown in a face image based on a plurality of name vectors corresponding to a plurality of names and based on a face vector corresponding to the face image. For example, the face image may be photographed by a camera on a mobile device and the system may be implemented on the mobile device to select one or more names from a contact list of names stored on the mobile device for tagging the face in the face image. In some embodiments, the system can be configured to select the plurality of name vectors based on a dataset that maps the plurality of names to a plurality of corresponding name vectors, where each name vector includes representations associated with a plurality of words associated with each name. In some embodiments, the system can be configured to apply a matching function to the face vector and each name vector of the plurality of name vectors to select one or more name vectors determined to be more closely associated with the person shown in the face image. In some embodiments, the system can be configured to output one or more names based on the selected one or more corresponding name vector. In some embodiments, the matching function can include an affine map, a logistic regression function, a fixed-width input neural net, or a recurrent neural network.

In some embodiments, a method of selecting a face image based on a name comprises: receiving a name; selecting, based on the name, a name vector from a plurality of name vectors in a dataset that maps a plurality of names to a plurality of corresponding name vectors in a vector space, wherein each name vector comprises representations associated with a plurality of words associated with each name; receiving a plurality of face vectors corresponding to a plurality of face images; selecting a face vector from the plurality of face vectors based on a plurality of similarity scores calculated for the plurality of corresponding face vectors, wherein for each name vector, a similarity score is calculated based on the name vector and each face vector; and outputting a face image based on the selected face vector.

In some embodiments, the representations are generated by word embedding each plurality of words associated with each name of the plurality of names.

In some embodiments, a first plurality of words comprises a first word and a second word, wherein a second plurality of words comprises a third word, and wherein the word embedding generates two name vectors corresponding to the first and second words that are closer in the vector space than two vectors generated for the corresponding first and third words.

In some embodiments, each face vector of the plurality of face vectors comprises a predefined number of elements, and wherein the method comprises: relating the name vector to a transformed name vector having the predefined number of elements; and calculating a similarity score between the name vector and the face vector based on the transformed name vector and the face vector.

In some embodiments, relating the name vector to the transformed name vector comprises: using an affine map to generate the transformed name vector based on the name vector.

In some embodiments, relating the name vector to the transformed name vector comprises: using a neural network comprising at least two layers to generate the transformed name vector based on the name vector.

In some embodiments, calculating the similarity score between the name vector and the face vector comprises: calculating a Euclidean distance between the transformed name vector and the face vector.

In some embodiments, the name vector comprises a first predefined number of elements and the face vector comprises a second predefined number of elements, and selecting the face vector comprises: receiving a weight matrix having a first and a second dimension that correspond to the first and the second predefined number of elements, respectively, wherein the weight matrix comprises precomputed values; generating a feature matrix by multiplying the name vector with the face vector; and calculating a similarly score between the name vector and the face vector based on the weight matrix and the feature matrix.

In some embodiments, the method comprises: for each user account from a plurality of user accounts, receiving a plurality of user names associated with each user account; and inputting the plurality of user names associated with each user account into a word-embedding algorithm to generate the mapping of the plurality of names to the plurality of corresponding name vectors, wherein the plurality of names corresponds to the plurality of user names.

In some embodiments, the word-embedding algorithm comprises one of word2vec, GloVe, or FastText.

In some embodiments, the name comprises a first name and a last name, and the method comprises: searching the first name in the dataset to select a first name vector from the plurality of name vectors; and searching the last name in the dataset to select a last name vector from the plurality of name vectors.

In some embodiments, the method comprises: relating a concatenation of the first and last name vectors to a transformed name vector; and calculating a similarity score between the name vector and the face vector based on the transformed name vector and the face vector.

In some embodiments, the method comprises: receiving a parameter associated with the name; selecting a matching function from a plurality of matching functions based on the parameter; and calculating the plurality of similarity scores based on the matching function.

In some embodiments, the parameter comprises one or more of: a gender, an age range, an ethnicity, a nationality, an eye color, or a hair color.

In some embodiments, a method of selecting a name based on a face image comprises: receiving a face image; generating a face vector corresponding to the face image; selecting, based on a plurality of names, a plurality of name vectors from a dataset that maps the plurality of names to the plurality of corresponding name vectors in a vector space, wherein each name vector comprises representations associated with a plurality of words associated with each name; selecting a name vector from the plurality of name vectors based on a plurality of similarity scores calculated for the plurality of corresponding name vectors, wherein for each name vector, a similarity score is calculated based on the face vector and each name vector; and outputting a name based on the selected name vector.

System and computer program product embodiments corresponding to one or more of the above methods are also disclosed.

Further embodiments, features, and advantages of the present disclosure, as well as the structure and operation of the various embodiments, are described in detail below with reference to accompanying drawings.

BRIEF DESCRIPTIONS OF THE FIGURES

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

Figure 4A:
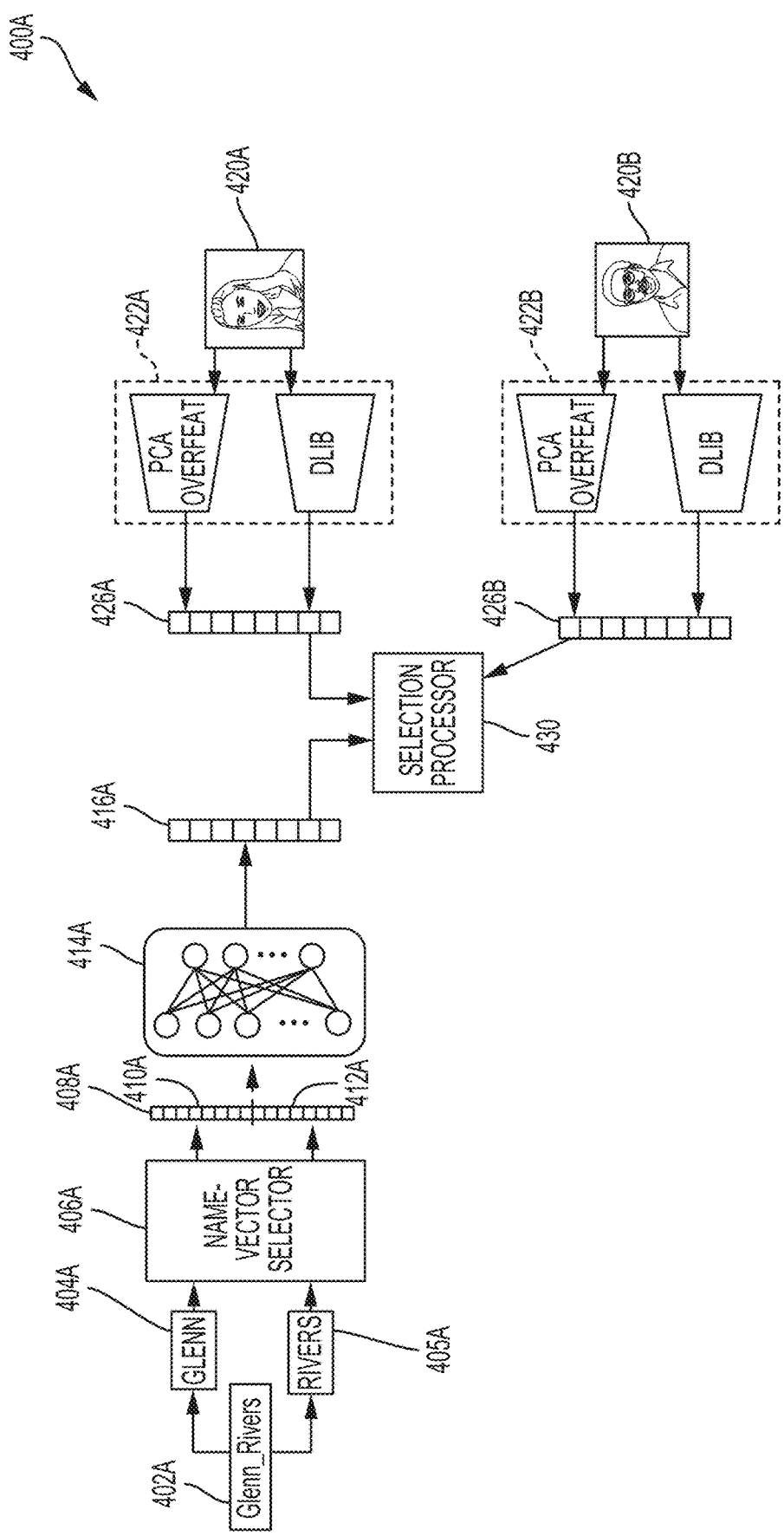
Figure 4B:
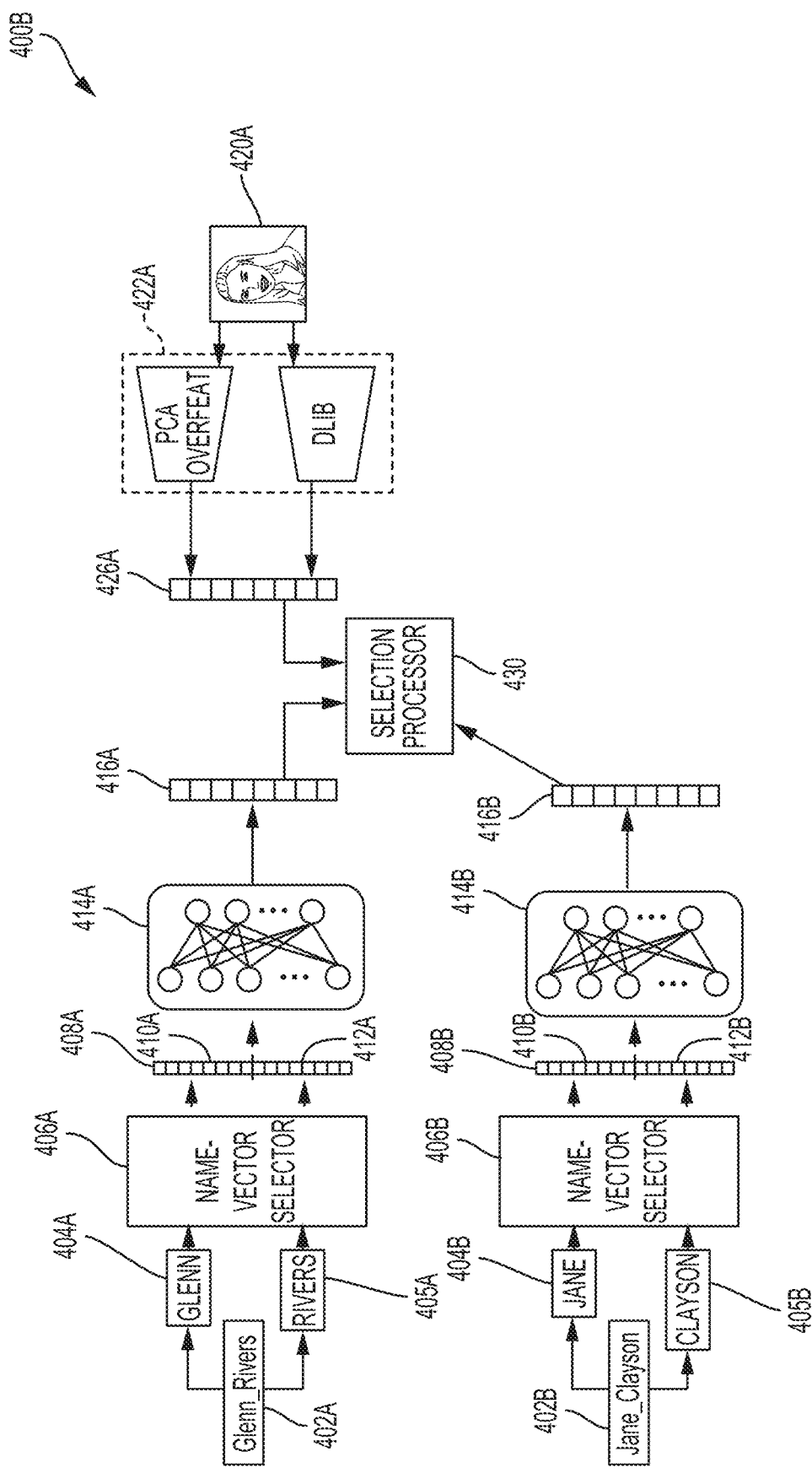
Figure 6:
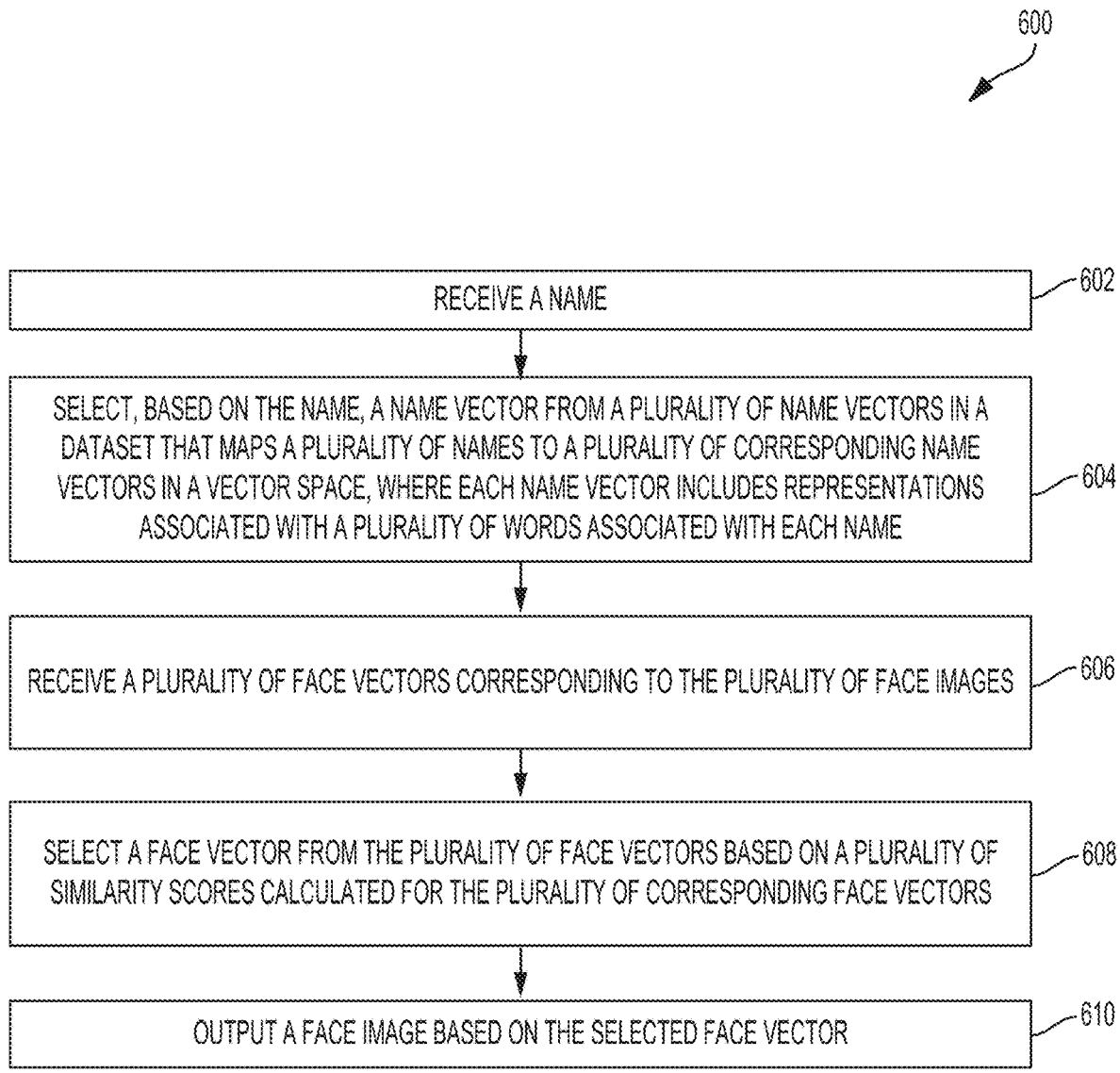
Figure 7:
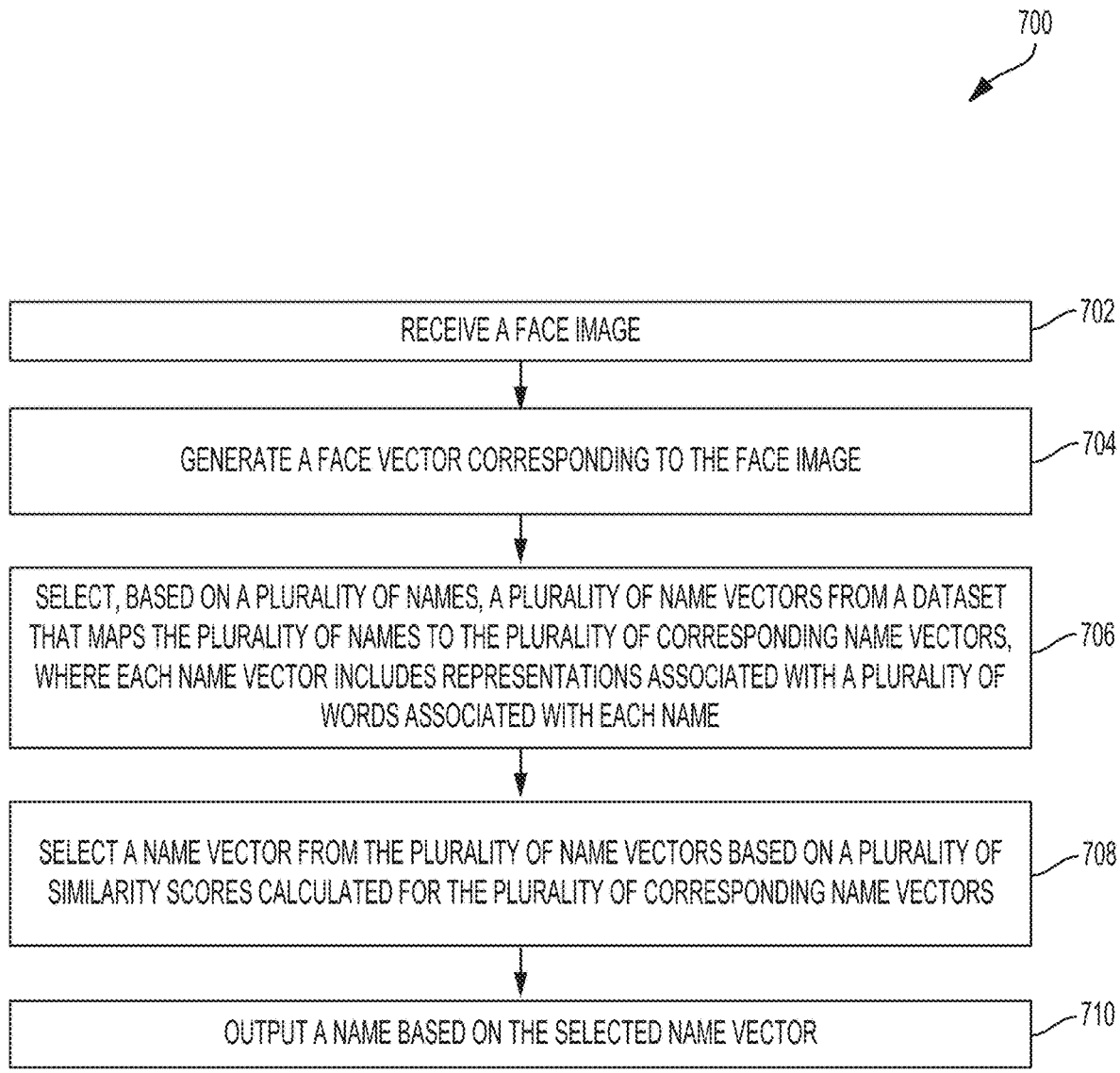
Figure 8:
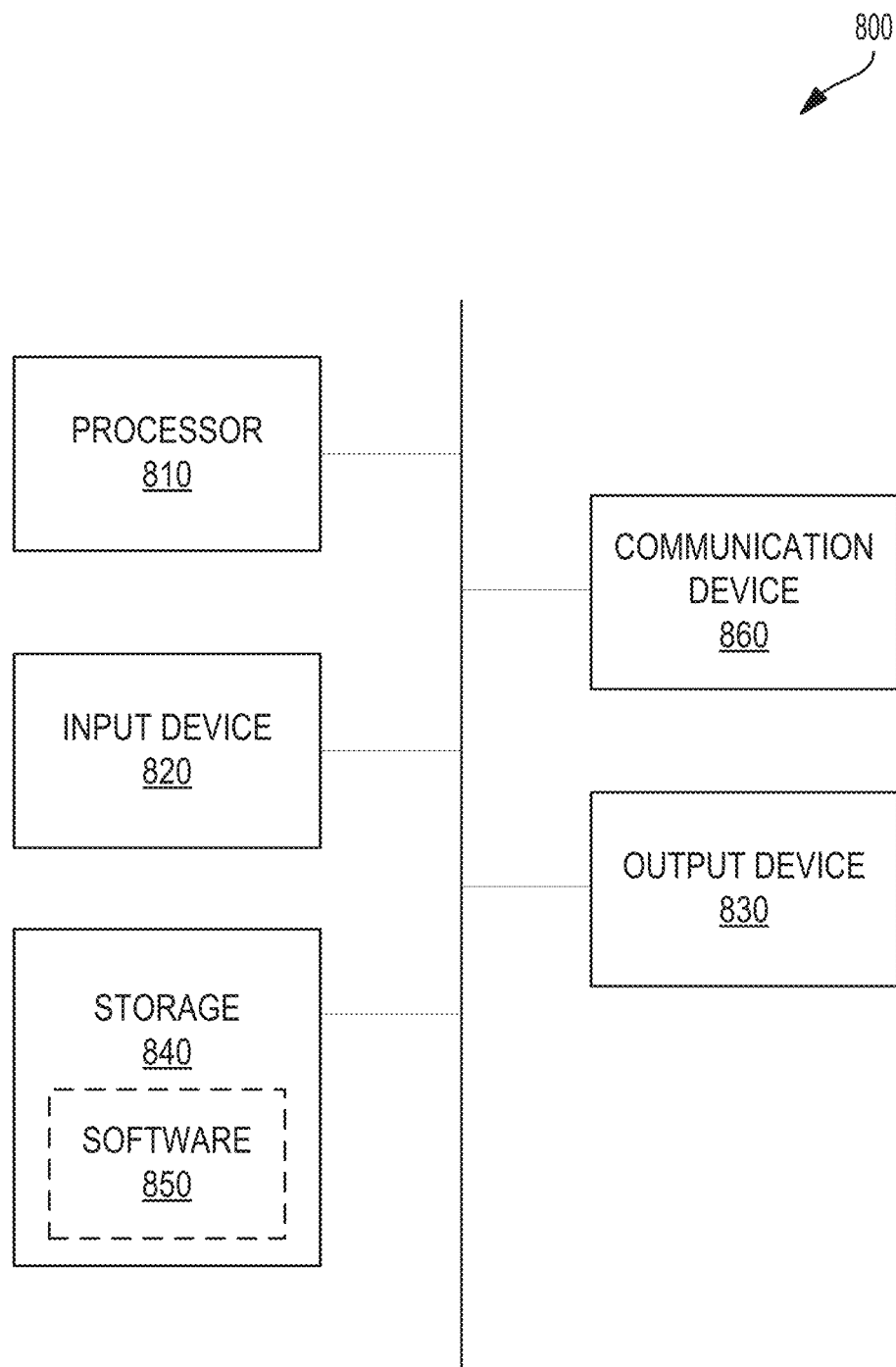

FIGS. 4A-B illustrate diagrams showing how a name can be selected for a face image and vice versa, according to some embodiments;

FIGS. 5A-D illustrate diagrams showing operations of various matching functions, according to some embodiments;

FIG. 6 illustrates a method for selecting a face image based on a name, according to some embodiments;

FIG. 7 illustrates a method for selecting a name based on a face image, according to some embodiments; and FIG. 8 illustrates an example of a computing device, according to some embodiments.

DETAILED DESCRIPTION OF THE DISCLOSURE

Described herein are systems and methods for selecting a face image based on a name and vice versa. In some embodiments, a system can be configured to match an unknown face image with a name or to match an unknown name with a face image with high accuracy by using a dataset that embeds a plurality of names into a vector space where each name is embedded as a corresponding positional vector in the vector space. In some embodiments, to embed the plurality of names, the system is configured to implement word embedding in which related names are embedded as "closer" (or "nearby") positional vectors (e.g., a representation for a point) in the vector space. "Closer" positional vectors can be quantified by a distance metric (e.g., a Euclidean distance, a cosine similarity, a Pearson correlation, a Minkowsky distance, etc.) such that a first positional vector can be closer to a second positional vector than a third positional vector if the distance between the first and second positional vector is less than that between the first and third positional vectors.

In some embodiments, the embedded names can be stored in the dataset as associations between a plurality of names and a plurality of corresponding name vectors, where each name vector can be a positional vector in the vector space and represents a plurality of words associated with each name.

In some embodiments, the system can be configured to select one or more names predicted to be associated with a person in the unknown face image by applying a matching function to a face vector corresponding to the face image and to a plurality of name vectors received from the dataset and that correspond to a plurality of names including the one or more selected names. Similarly, the system can be configured to select one or more face images predicted to be associated with an unknown name by applying the matching function to a name vector corresponding to the name and received from the dataset and to a plurality of face vectors corresponding to a plurality of face images including the selected one or more face images.

Figure 1:
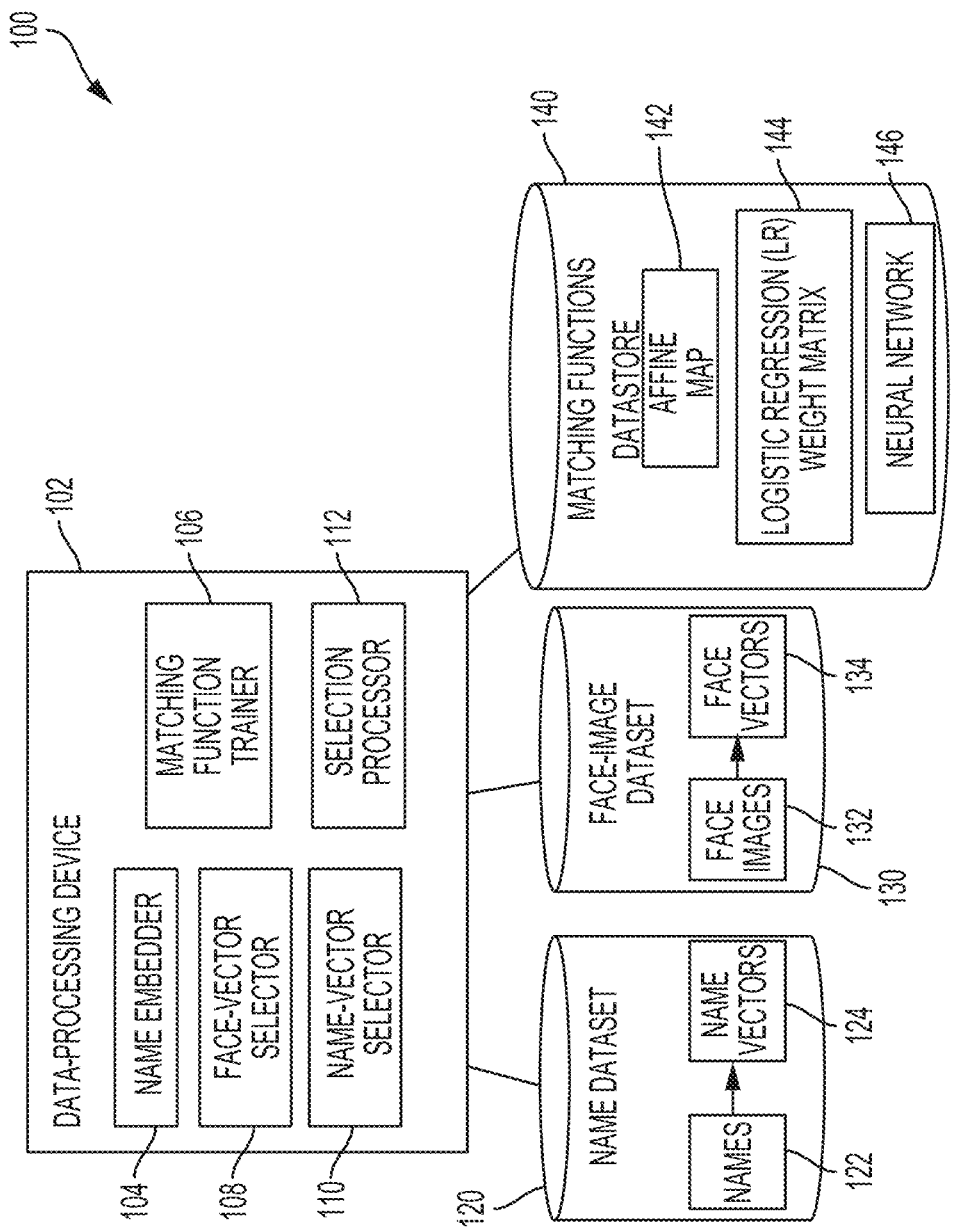
FIG. 1 illustrates a system for selecting names for face images and vice versa, according to some embodiments.

FIG. 1 illustrates a system 100 for selecting names for face images and vice versa, according to some embodiments. System 100 includes a data-processing device 102 communicatively coupled to a name dataset 120, a face-image dataset 130, and matching functions 140. In some embodiments, data-processing device 102 can be implemented on one or more virtual machines, servers, hardware appliance, general-purpose computers, or a combination thereof. In some embodiments, data-processing device 102 can be communicatively coupled to a user client such as a mobile device or a personal laptop to enable users to access the face-name matching functionality provided by data-processing device 102. In some embodiments, data-processing device 102 can be coupled to the client device via a network that includes a local area network (LAN), a wide area network (WAN), the Internet, a Wi-Fi network, a WiMAX network, a cellular network (e.g., 3G, 4G, 4G Long Term Evolution (LTE)), or a combination thereof. Further, the network may implement one or more wired and/or wireless standards or protocols.

In some embodiments, name dataset 120 can be configured to store associations between a plurality of names 122 and a plurality of corresponding name vectors 124. In some embodiments, name dataset 120 can be configured to store the associations in a database, such as a relational database that stores associations in one or more tables. In some embodiments, data-processing device 102 can be configured to embed the plurality of names 122 into a vector space including the plurality of name vectors 124. The embedding process includes converting a name into a positional vector in the vector space, in which the positional vector corresponds to the name vector and can be an n-dimensional vector where n corresponds to a number of elements in the name vector. In some embodiments, the name vector can be a binary vector in which each element is a binary value (e.g., 0 or 1). In some embodiments, the name vector can be integer vector in which each element is an integer. In some embodiments, the name vector can be a real-valued vector in which each element can be represented by, e.g., a double data type.

In some embodiments, data-processing device 102 can be configured to perform the name embedding process using character embedding, n-gram embedding, or word embedding. In some embodiments, character embedding includes associating each character of a name with a vector and generating a name vector having a fixed width (e.g., being n elements) by inputting each of the vectors into a neural network (e.g., a recurrent neural network). In some embodiments, n-gram embedding includes projecting a name onto a vector based on unigrams (one character), bigrams (two contiguous characters), n-grams (n contiguous characters), or a combination thereof in the name. Then, the resulting vector of the n-gram embedding can be compressed to a fixed-size name vector having n elements. For example, the resulting vector may be hashed into the fixed-size name vector. In some embodiments, as will be further described with respect to FIG. 2, word embedding includes embedding related names as "closer" positional vectors in a vector space.

Experiments were run on the LFW (Labelled Faces in the Wild) dataset generated by the University of Massachusetts Amherst in an A/B testing approach to evaluate the face-name matching accuracies using the various name embedding processes. In each experiment, data-processing device 102 is presented with a face image and two names of which only one name corresponds to the correct name of the person shown in the face image. Using this A/B testing experimental setup, randomly matching one of the names to the face image shown would result in an average accuracy of 50% and an improved matching scheme would achieve an average accuracy above 50%. The experiments yielded the following ranges of maximum A/B accuracy for each of the name embedding processes discussed above: 50.5%-70.1% for character embedding, 49.7%-69% for n-gram embedding, and 72%-80.5% for word embedding. The range of accuracies for each name embedding process includes the maximum accuracies achieved with using the specific name embedding process with various matching functions (e.g., including an affine map, logistic regression, a neural network with various hidden layers and activation parameters, a recurrent neural network with various hidden layers and activation parameters, etc.). The experiments revealed a surprising result in that the word embedding process—typically used in natural language processing to classify text or associate similar words with each other (e.g., female and queen)—can be used to achieve high accuracy in matching faces and names. Accordingly, in some embodiments, to achieve high name-face matching accuracy, system 100 can be configured to implement word embedding as the process to embed names into vector representations (e.g., positional vectors) in a vector space.

Returning to FIG. 1, in some embodiments, data-processing device 102 can be configured to implement word embedding to embed names 122 into a vector space including a plurality of name vectors 124 where each of names 122 can be stored in association with a unique name vector of real numbers. For example, a name and a corresponding name vector may be stored in the same entry of a table in the relational database. In some embodiments, the name vector can be an n-dimensional vector where n corresponds to a number of elements in each name vector. In some embodiments, the name vector used to represent a name can be associated with a plurality of words associated with that name, which is further described below with respect to FIG. 2.

In some embodiments, face-image dataset 130 can be configured to store associations between a plurality of face images 132 and a plurality of corresponding face vectors 134. In some embodiments, face-image dataset 130 can be configured to store the associations in a database, such as a relational database that stores associations in one or more tables. In some embodiments, face images 132 can be stored in a vector representation (e.g., a positional vector) in a vector space. In particular, each of face images 132 can be stored in association with a unique face vector of real numbers to represent that face image. For example, a face image and a corresponding face vector may be stored in the same entry of a table in the relational database. In some embodiments, the face vector can be an n-dimensional vector where n corresponds to the number of elements in the face vector.

For example, generating a face vector for a face image using Dlib (e.g., an example face-vectorization algorithm)

results in a face vector having 128 elements (also referred to as dimensions in the vector space). In general, a face-vectorization algorithm may detect facial landmarks (e.g., eyes, eyebrows, nose, mouth, etc.) using support vector machines or neural network object detection algorithms such as a histogram of oriented gradients (HOG) and linear support vector machines (SVM) object detection algorithm. Then, a detected facial landmark may be represented by a plurality of coordinates. The coordinates of each of the facial landmarks may be used to generate a face vector corresponding to the face image. By using such face-vectorization algorithms, two face images of the same person would be converted into positional vectors that are "closer" to each other in a vector space.

In some embodiments, matching functions datastore 140 can be configured to store a plurality of types of matching functions such as one or more of each of affine map 142, logistic regression (LR) weight matrix 144, or neural network 146. In some embodiments, neural network 146 can include a fixed-width input neural net or a Recurrent Neural Network (RNN). The operations of each of the above matching functions are further described below with respect to FIGS. 5A-D, according to some embodiments. In some embodiments, matching functions datastore 140 can be configured to store a plurality of matching functions of the same type where each matching function can be configured based on a different set of training data. For example, matching functions datastore 140 may store a first and a second affine map 142. In this example, the first affine map may be trained based on training data meeting a first parameter (e.g., a first nationality) and the second affine map may be trained based on training data meeting a second parameter (e.g., a second nationality). In some embodiments, the parameters can include a gender, an age range, an ethnicity, a nationality, an eye color, or a hair color.

In some embodiments, each of the matching functions in matching functions datastore 140 can be configured to quantify a similarity between a name vector and a plurality of face vectors to enable selection processor 112 to select a face image for a name represented by the name vector. Similarly, each of the matching functions can be configured to quantify a similarity between a face vector and a plurality of name vectors to enable selection processor 112 to select a name for a face image represented by the face vector.

In some embodiments, to perform name-face matching, data-processing device 102 can be configured to include the following components: name embedder 104, matching-function trainer 106, face-vector selector 108, name-vector selector 110, and selection processor 112. Each of these components may include a set of programming instructions stored in memory and executable by one or more processors of data-processing device 102.

In some embodiments, name embedder 104 can be configured to generate name dataset 120 by word embedding a plurality of words associated with each name into a vector space used to represent names. For example, each name may be converted into a name vector in the vector space where the name vector includes a plurality of real values. In some embodiments, name embedder 104 receives information related to user accounts of social media to perform word embedding. For example, name embedder 104 may perform word embedding on a plurality of user names associated with each user account, as will be further described below with respect to FIG. 2. In some embodiments, name embedder 104 can be configured to run a word-embedding algorithm such as Word2Vec or GloVe.

In some embodiments, matching-function trainer 106 can be configured to train the one or more types of matching functions stored in matching functions datastore 140. For example, matching-function trainer 106 may be configured to train one or more of affine map 142, LR weight matrix 144, and neural network 146, as described below with respect to FIG. 3. In some embodiments, matching-function trainer 106 can be configured to train a plurality of matching functions of the same type using different sets of training data. For example, each set of training data may include information (e.g., associations between names and face images) for people with characteristics that match one or more parameters. In some embodiments, a parameter can include a gender, an age range, an ethnicity, a nationality, an eye color, or a hair color.

In some embodiments, selection processor 112 can be configured to select a face image from a plurality of face images 132 based on a name received at data-processing device 102. In some embodiments, the selected face image may be that of a person predicted to have the received name. In some embodiments, selection processor 112 can be configured to select a number of face images that are predicted to correspond to the received name based on an input from the user where the input specifies the number of face images to select. In some embodiments, selection processor 112 can be configured to select the face image based on a name vector corresponding to the name and a plurality of face vectors corresponding to a plurality of face images. In some embodiments, to determine the name vector and the plurality of face vectors, selection processor 112 can be configured to make function calls to name-vector selector 110 and face-vector selector 108, respectively. In some embodiments, selection processor 112 can be configured to perform the functionality of name-vector selector 110 and face-vector selector 108 directly.

In some embodiments, upon selecting a plurality of face vectors for a received name, data-processing device 102 can be configured to select one or more matching functions from matching functions datastore 140 to calculate a plurality of similarity scores between the plurality of corresponding face vectors and a name vector corresponding to the name. Each similarity score may quantify a similarity between the name vector and the face vector corresponding to the similarly score. In some embodiments, a higher similarity score may indicate greater similarity in which case a face vector having the highest score from the plurality of similarity scores and associated with a face image may be determined to include a person predicted to have the name. In some embodiments, a high similarity score corresponds to a shorter distance calculated between vectors, in which case a face vector being selected is predicted to correspond to the name may be associated with the shortest distance to the name vector as compared to the distance between the name vector and each of the other face vectors from the plurality of face vectors.

Operations of each type of matching function such as affine map 142, LR weight matrix 144, and neural network 146 are further described below with respect to FIGS. 5A-D.

In some embodiments, selection processor 112 can be configured to perform similar functionality to select a name from a plurality of names 122 based on a face image received at data-processing device 102. In some embodiments, the selected name may be that of a person predicted to be shown in the received face image. In some embodiments, selection processor 112 can be configured to select a number of names that are more likely to correspond to the received face image based on an input from the user where the input specifies the number of names to select. In some embodiments, selection processor 112 can be configured to select the name based on a face vector corresponding to the face image and a plurality of name vectors corresponding to a plurality of names including the received name. In some embodiments, to determine the name vector and the plurality of face vectors, selection processor 112 can be configured to make function calls to name-vector selector 110 and face-vector selector 108, respectively. In some embodiments, selection processor 112 can be configured to perform the functionality of name-vector selector 110 and face-vector selector 108 directly.

In some embodiments, upon selecting a plurality of name vectors for a received face image, data-processing device 102 can be configured to select one or more matching functions from matching functions datastore 140 to calculate a plurality of similarity scores between the plurality of corresponding name vectors and a face vector corresponding to the face image. Each similarity score may quantify a similarity between the face vector and the name vector corresponding to the similarly score. In some embodiments, a name vector having the highest similarity score from the plurality of similarity scores and associated with name may be determined to be the predicted name of the person shown in the received face image. In some embodiments, a high similarity score corresponds to a shorter distance calculated between vectors, in which case a name vector being selected is predicted to correspond to the face vector may be associated with the shortest distance to the face vector as compared to the distance between the face vector and each of the other name vectors from the plurality of name vectors. Operations of each type of matching function such as affine map 142, LR weight matrix 144, and neural network 146 are further described below with respect to FIGS. 5A-D.

In some embodiments, name-vector selector 110 can be configured to select a name vector based on a name by searching name dataset 120. For example, when name dataset 120 is configured as a database that stores mappings between names 122 and corresponding name vectors 124, name-vector selector 110 may query the database for the name vector associated with the name. As described above, the selected name vector includes representations (e.g., real numbers) associated with a plurality of words (e.g., user names) associated with the name.

In some embodiments, face-vector selector 108 can be configured to operate similar to name-vector selector 110 and select a face vector based on a face image by searching face-image dataset 130. For example, when face-image dataset 130 is configured as a database that stores mappings between face images 132 and corresponding face vectors 134, face-vector selector 108 may query the database for the face vector associated with the face image. As described above, the selected face vector includes representations (e.g., real numbers) that correspond to the face image. In some embodiments, face-vector selector 108 can be configured to apply one or more of the following face-vectorization algorithms: Dlib, OverFeat, and OpenFace. In some embodiments, face-vector selector 108 can be configured to apply two or more face-vectorization algorithms (e.g., Dlib and OverFeat) to a face image to generate two or more corresponding face sub-vectors. In these embodiments, face-vector selector 108 can be configured to concatenate the two or more face sub-vectors to generate a face vector for the face image. In some embodiments, face-vector selector 108 may be configured to apply principal component analysis (PCA) on the face vector generated for the face image to reduce a number of dimensions of the face vector.

Figure 2:
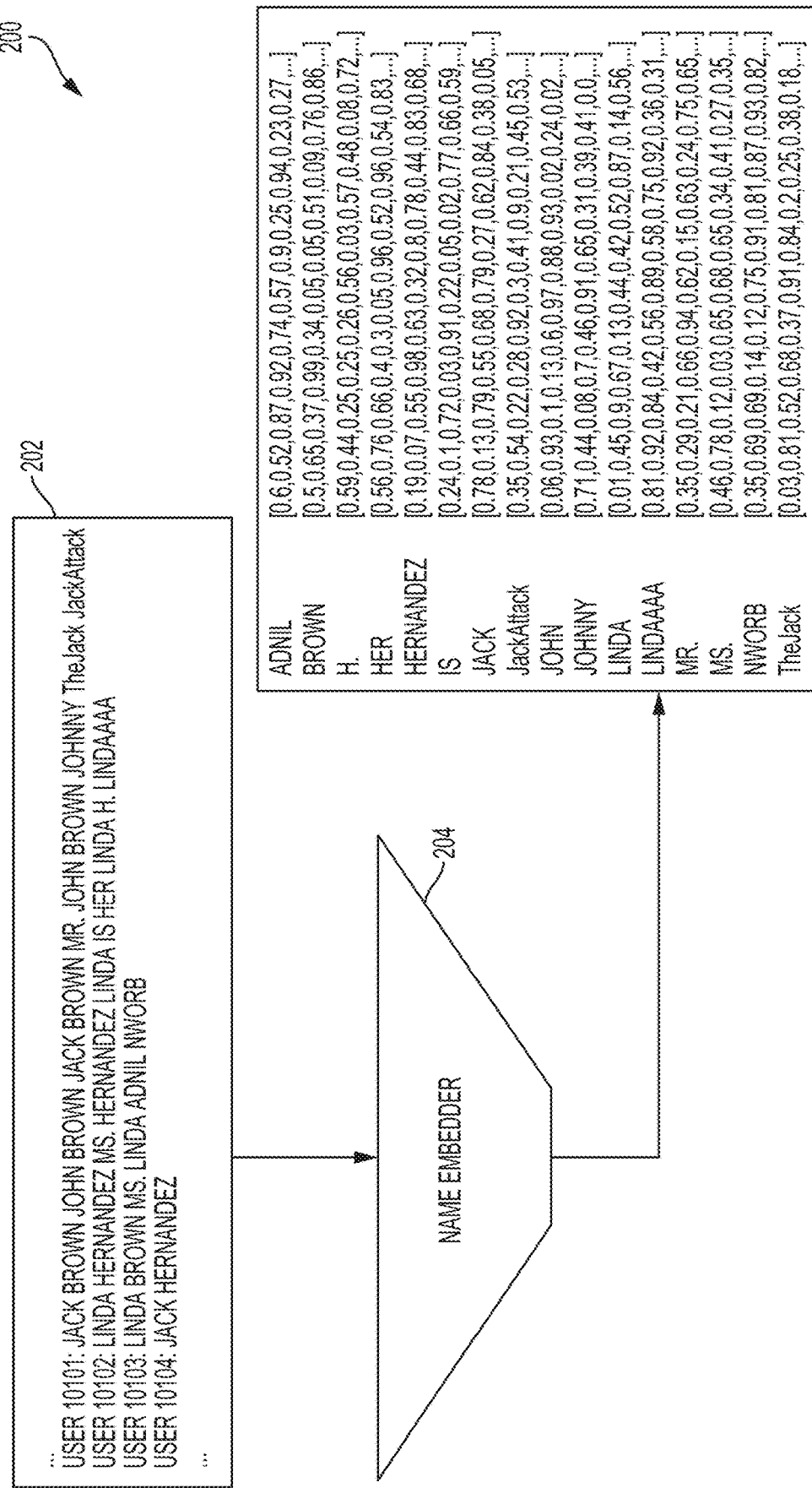
FIG. 2 illustrates a diagram showing an example name dataset being generated, according to some embodiments.

FIG. 2 illustrates a diagram 200 showing an example name dataset 206 being generated, according to some embodiments. In some embodiments, name embedder 204 (e.g., name embedder 104 of FIG. 1) can be configured to apply a word-embedding algorithm to embed names in input dataset 202 into vector representations, as shown in name dataset 206. For example, the word-embedding algorithm may include Word2Vec, GloVe, or FastText. In general, word-embedding algorithms such as Word2Vec and GloVe may implement neural networks to generate fixed-dimensional vector summaries of word traits such as syntactic and semantic categories based on a large set of documents. These neural networks may be configured to optimize the ability of a generated vector for a word to correctly predict language phenomena within the local area of occurrence (e.g., within a sentence or a window of a fixed number of words) of that word. As will be further described below, input dataset 202 is specially configured to include sets of name words associated with each user, according to some embodiments. By taking advantage of the optimization functionality of word-embedding algorithms, name embedder 204 may be configured to word embed associated names as corresponding name vectors that are "close" to each other in the name vector space, according to some embodiments. In particular, a first plurality of words (e.g., a plurality of names associated with a user) may include a first word and a second word whereas a second plurality of words (e.g., a plurality of names associated with a different user) may include a third word. Upon performing word embedding on the words in each of the first and second plurality of words, name embedder 204 may generate two name vectors corresponding to the first and second words that are "closer" in the vector space than two vectors generated for the corresponding first and third words.

In some embodiments, input dataset 202 includes a plurality of user accounts of social media and a plurality of words associated with each user account. In some embodiments, the plurality of words includes a plurality of names associated with each user account. For example, input dataset 202 may include for user 10103, the following names: Linda Brown, Ms. Linda Adnil, and Nworb. In another example, input dataset 202 may include for user 10101, the following names: Jack Brown, John Brown, Jack, Brown, Mr. John Brown, Johnny, TheJack, and JackAttack.

In some embodiments, input dataset 202 includes a plurality of persons and a plurality of words associated with each person. Each of the words for each person may be a name associated with that person. For example, the names may be one or more first names, one or more nickname, one or more middle names, one or more last names, or a combination thereof. In some embodiments, input dataset 202 can be generated by parsing a document listing one or more name changes. For example, these documents may include a newspaper publishing a name change, Department of Motor Vehicle (DMV) documents showing different names for the same person, Internal Revenue Service (IRS) documents, immigration documents, or the like.

In some embodiments, name embedder 204 can be configured to concatenate each plurality of words associated with each user account to generate a plurality of sequences corresponding to the plurality of user accounts. Then, name embedder 204 can be configured to apply the word-embedding algorithm on the plurality of sequences to generate name dataset 206. As discussed above with respect to FIG. 1, word embedding converts each name from input dataset 202 into a vector representation in a vector space of n-dimensions. Each of the vector representations may be a positional vector (e.g., a representation of a point in the vector space) having n elements. In some embodiments, word embedding embeds related names into "closer" positional vectors in the vector space. For example, the positional vectors corresponding to "Jack" and "John" may be closer to each other than the positional vectors corresponding to, for example, "Jack" and "Linda."

As discussed above, the "closeness" between two vectors can be quantified by calculating a distance metric between the two vectors. For example, the distance metric may be calculated based on a Euclidean distance, a cosine similarity, a Pearson correlation, a Manhattan distance, a Minkowsky distance, etc. In each case, a smaller distance may indicate that two vectors are "closer" to each other in the vector space. For example, a first positional vector is closer to a second positional vector than a third positional vector if the distance between the first and second positional vector is less than that between the first and third positional vectors.

As shown in diagram 200, name dataset 120 embeds the names from each plurality of names into a vector space where each name can be associated with a unique name vector, as shown in dataset 206. For example, the name Jack is associated with the name vector [0.78, 0.13, 0.79, 0.55, 0.68, 0.79, 0.27, 0.62, 0.84, 0.38, 0.05, . . . ]. In some embodiments, by word embedding the names from each sequence of the plurality of sequences, two names from one sequence will be embedded into two corresponding name vectors that are closer to each other in the vector space as compared to two vectors corresponding to two names from separate sequences. For example, the distance between the name vectors corresponding to "Adnil" and "Linda" may be smaller than that between the name vectors corresponding to, for example, "Adnil" and "Jack.".

Figure 3:
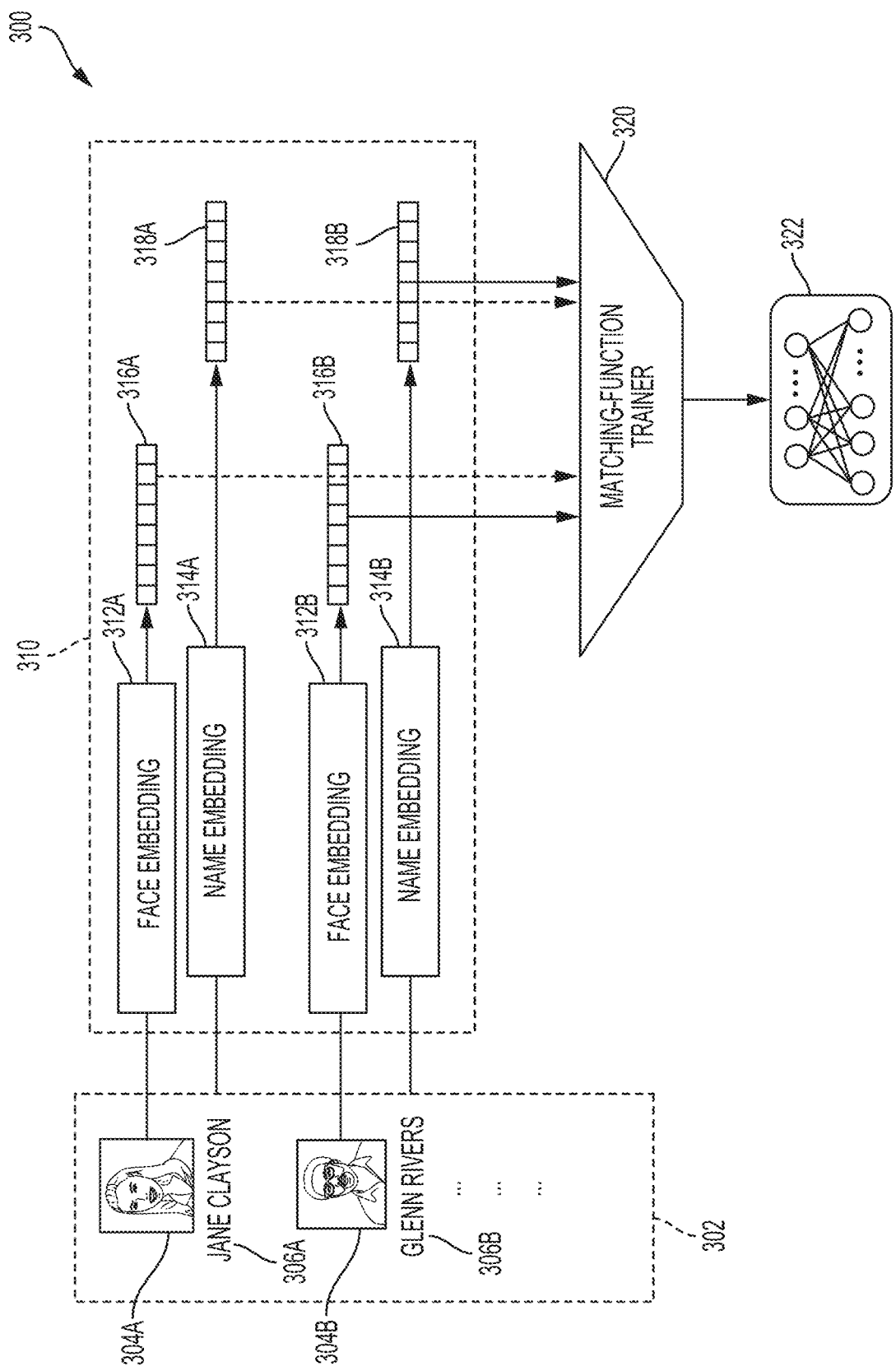
FIG. 3 illustrates a diagram showing an example matching function being trained on a name-face dataset, according to some embodiments.

FIG. 3 illustrates a diagram 300 showing an example matching function 322 being trained on a name-face dataset, according to some embodiments. In some embodiments, matching-function trainer 320 (e.g., matching-function trainer 106 of FIG. 1) can be configured to train matching function 322 based on a training dataset 302 representing the name-face dataset. In some embodiments, matching function 322 is configured to generate a vector having the same number of elements as a face vector based on an input name vector. As will be described below, the name-face dataset may include pairs of names and face images that are converted into pairs of name vectors and face vectors. By providing the correct associations between name vectors and face vectors to matching function 322, matching-function trainer 320 can be configured to tune one or more parameters of matching function 322 such that for a given name, matching function 322 may generate a vector that is "close" to a face vector corresponding to a face image showing the person having the given name. In some embodiments, the one or more parameters being tuned include weights of matching function 322. These tuned weights are used with the input name vector to calculate the predicted (i.e., "close") vector corresponding to the face image.

As shown in diagram 300, matching function 322 may represent any of the matching functions (e.g., affine map 142 or neural network 146) stored in matching functions datastore 110, as described above with respect to FIG. 1.

In some embodiments, training dataset 302 includes pairs of face images 304 and names 306. For example, training dataset 302 includes: a face image 304A associated with name 306A ("Jane Clayson") and a face image 304B associated with name 306B ("Glenn Rivers"). In some embodiments, training dataset 302 includes face images 304 and corresponding names 306 associated with people having characteristics that satisfy one or more parameters. For example, training dataset 302 may include Americans who are between 18 and 65.

In some embodiments, a data-processing device (e.g., data-processing device 102 of FIG. 1) can be configured to perform vectorization 310 of face images 304 and corresponding names 306. In particular, a name embedder (e.g., name embedder 104) may perform name embedding 314A-B of names 306A-B into a first vector space to generate corresponding name vectors 318A-B. For example, the name embedder may apply one or more word-embedding algorithms, as described in FIG. 1, to perform name embedding 314. As discussed above, names that are associated with each other may be embedded into name vectors that are "closer" to each other in the first vector space. Similarly, the data-processing device may be configured to perform face embedding 312A-B of face images 306A-B into a second vector space to generate corresponding face vectors 316A-B. For example, the data-processing device may apply one or more face-vectorization algorithms, as described in FIG. 1, to perform face embedding 312. As discussed above, faces that are more similar to each other may be embedded into face vectors that are "closer" to each other in the second vector space.

In some embodiments, matching-function trainer 320 can be configured to train matching function 322 based on associations between face vectors 316A-B and corresponding name vectors 318A-B. In some embodiments, the training process includes configuring one or more parameters of matching function 322 based on the pairs of vectors input into matching function 322. In some embodiments, based on the input pairs of names and face images, for any input name, matching function 322 can be trained to generate a vector that is "close" in vector space to a face vector corresponding to the face image showing the person having that name.

FIGS. 4A-B illustrate diagrams 400A-B showing how a name can be selected for a face and vice versa, according to some embodiments. The following descriptions may refer to the components of data-processing device 102 and various datasets 120, 130, and 140, as described above with respect to FIG. 1.

FIG. 4A illustrates a diagram 400A that shows how a selection processor 430 (e.g., selection processor 112 of FIG. 1) can be configured to select one of face images 420A-B for a received name 402A. As shown in diagram 400A, selection processor 430 may compare a transformed name vector 416A corresponding to received name 402A with a plurality of face vectors 426A-B corresponding to face images 420A-B to select one of face images 420A-B as being more closely associated with name 402A. In some embodiments, each of name vector 416A and face vectors 426A-B has the same number of elements.

In some embodiments, name-vector selector 406A (e.g., name-selector 108) can generate name vector 408A based on received name 402A. For example, name-vector selector 406A may query a database (e.g., name dataset 120) storing associations between names and name vectors to retrieve name vector 408A. In some embodiments, the associations between names and name vectors can be generated based on a word embedding process, as discussed above with respect to FIGS. 1 and 2. As discussed above, in A/B testing experiments run on the LFW dataset of name-face image pairs, the use of word embedding on names resulted in an A/B accuracy between 72-80.5%, which vastly exceeded the expected accuracy of 50% based on random selection.

In some embodiments, name-vector selector 406A can be configured to retrieve a plurality of name sub-vectors 410A and 412A corresponding to a plurality of independent portions 404A and 405A of received name 402A in a similar manner. In some embodiments, a portion of received name 402A may include a first name, a middle name, or a last name. In some embodiments, name-vector selector 406A can concatenate the plurality of name sub-vectors 410A-412A to generate name vector 408A that represents received name 402A.

In some embodiments, name-vector selector 406A can select a matching function 414A (e.g., affine map 142 or neural network 146) to generate transformed name vector 416A based on name vector 408A. In some embodiments, matching function 414A can be configured to convert the vector representation (i.e., name vector 408A) of received name 402A into the vector space of face vectors 426A-B to enable received name 402A to be comparable to face images 420A-B.

In some embodiments, a face-vector selector can apply one or more face-vectorization algorithms 422A-B (e.g., PCA OverFeat or Dlib), as described above with respect to FIG. 1, to generate face vectors 426A-B corresponding to face images 420A-B, respectively. In some embodiments where the face-vector selector applies a plurality of face-vectorization algorithms 422A on a face image 420A, a plurality of face sub-vectors corresponding to the plurality of face-vectorization algorithms 422A is generated. In these embodiments, face-vector selector can concatenate the plurality of face sub-vectors to generate face vector 426A for face image 420A.

In some embodiments, selection processor 430 can be configured to calculate a similarity score for each of face vectors 426A-B where each similarity score quantifies a similarity between each face vector 426A-B and transformed name vector 416A. In some embodiments, selection processor 430 can rank face vectors 426A-B by the corresponding similarity scores to determine one or more corresponding face images 420A-B that are more closely associated with received name 402A. In some embodiments, calculating the similarity score between two vectors includes calculating a distance metric (e.g., a Euclidean distance). In these embodiments, a smaller distance indicates that the two vectors are more "similar" and more closely associated with each other. For example, selection processor 430 may calculate Euclidean distances of 15.45 and 12.79 for face vectors 426A and 426B, respectively. In this example, selection processor 430 may select and output face image 420B corresponding to face vector 426B as showing a picture of the person having received name 402A of "Glenn Rivers."

FIG. 4B illustrates a diagram 400B that shows how selection processor 430 can be configured to select one of names 402A-B for a received face image 420A. As shown in diagram 400B, selection processor 430 may compare transformed name vectors 416A-B corresponding to names 402A-B with face vector 426A corresponding to received face image 420A to select one of names 402A-B as being more closely associated with received face image 420A. In some embodiments, each of name vectors 416A-B and face vector 426A has the same number of elements.

As described above with respect to FIG. 4A, a face-vector selector can apply one or more face-vectorization algorithms 422A (e.g., PCA OverFeat or Dlib) to generate face vectors 426A corresponding to received face image 420A. Similarly, as described above with respect to FIG. 4A, name-vector selectors 406A-B can generate name vectors 408A-B based on respective names 402A-B. Additionally, matching functions 414A-B may be applied on respective name vectors 408A-B to generate respective, transformed name vectors 416A-B having the same number of elements as face vector 426A.

In some embodiments, selection processor 430 can be configured to calculate a similarity score for each of transformed name vectors 416A-B where each similarity score quantifies a similarity between each transformed name vector 416A-B and face vector 426A. In some embodiments, selection processor 430 can rank transformed name vectors 416A-B by the corresponding similarity scores to determine one or more corresponding names 402A-B that are predicted to be associated with received face image 420A. In some embodiments, calculating the similarity score between two vectors includes calculating a distance metric (e.g., Euclidean distance). In these embodiments, a smaller distance represents that the two vectors are more "similar" or likely to be associated with each other. For example, selection processor 430 may calculate Euclidean distances of 15.45 and 14.33 for transformed name vectors 416A and 416B, respectively. In this example, selection processor 430 may select and output name 402B of "Jane Clayson" corresponding to transformed name vector 416B as being the predicted name of the person shown in received face image 420A.

FIGS. 5A-D diagrams 500A-D showing operations of various matching functions, according to some embodiments. The following descriptions may refer to the components of data-processing device 102 and various datasets 120, 130, and 140, as described above with respect to FIG. 1. Diagrams 500A-D depict one or more name vectors 502, 502A, 502B, and 502C, each of which may correspond to a received name or a portion of the received name. As discussed above with respect to FIGS. 1 and 2, a selection processor can be configured to generate a name vector (e.g., name vector 502) from a received name by querying a name dataset (e.g., name dataset 120) storing associations between names and corresponding name vectors. In some embodiments, the name dataset may be configured by performing word embedding on a plurality of names.

Figure 5A:
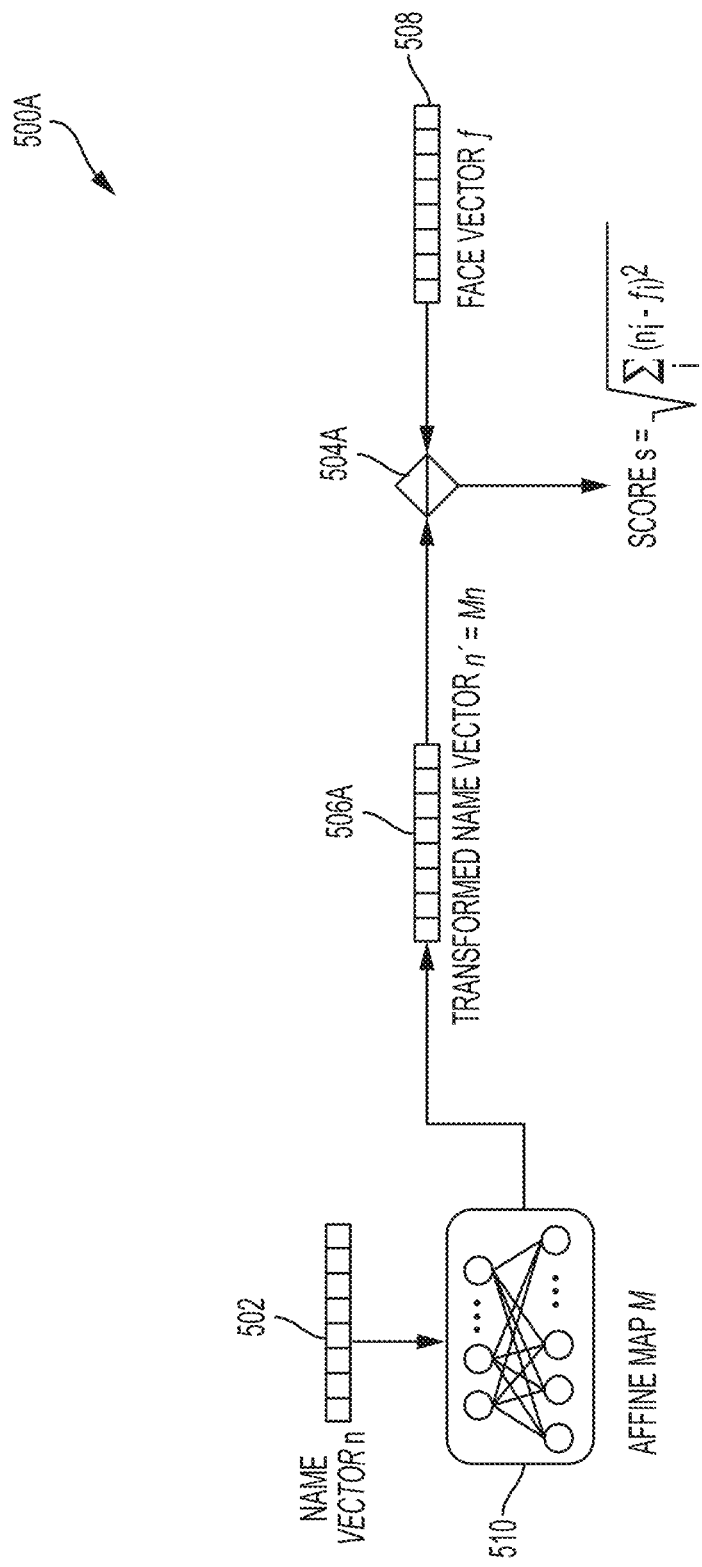

FIG. 5A illustrates a diagram 500A that shows how a selection processor (e.g., selection processor 112 of FIG. 1) can be configured to apply an affine map 510 (labeled M) to generate a similarity score 504A based on a name vector 502 (labeled n) and a face vector 508 (labeled f). In some embodiments, affine map 510 can include a matrix configured by matching-function trainer 106 based on a training dataset, as described above with respect to FIG. 3. In some embodiments, matching-function trainer 106 can configure affine map 510 with ridge regression and including a regularization parameter to avoid overfitting the training dataset. In some embodiments, the selection processor can apply affine map 510 to name vector 502 to generate a transformed name vector 506A (labeled n'=M*n). In some embodiments, applying affine map 510 includes performing matrix multiplication between name vector 502 and affine map 510. As discussed above with respect to FIGS. 4A-B, transformed name vector 506A may have the same number of elements as face vector 508.

In some embodiments, the selection processor can be configured to calculate similarity score 504A (labeled s) based on transformed name vector 506A and face vector 508. In some embodiments, similarity score 504A can be calculated based on calculating the distance (e.g., Euclidean distance) between transformed name vector 506A and face vector 508.

Figure 5B:
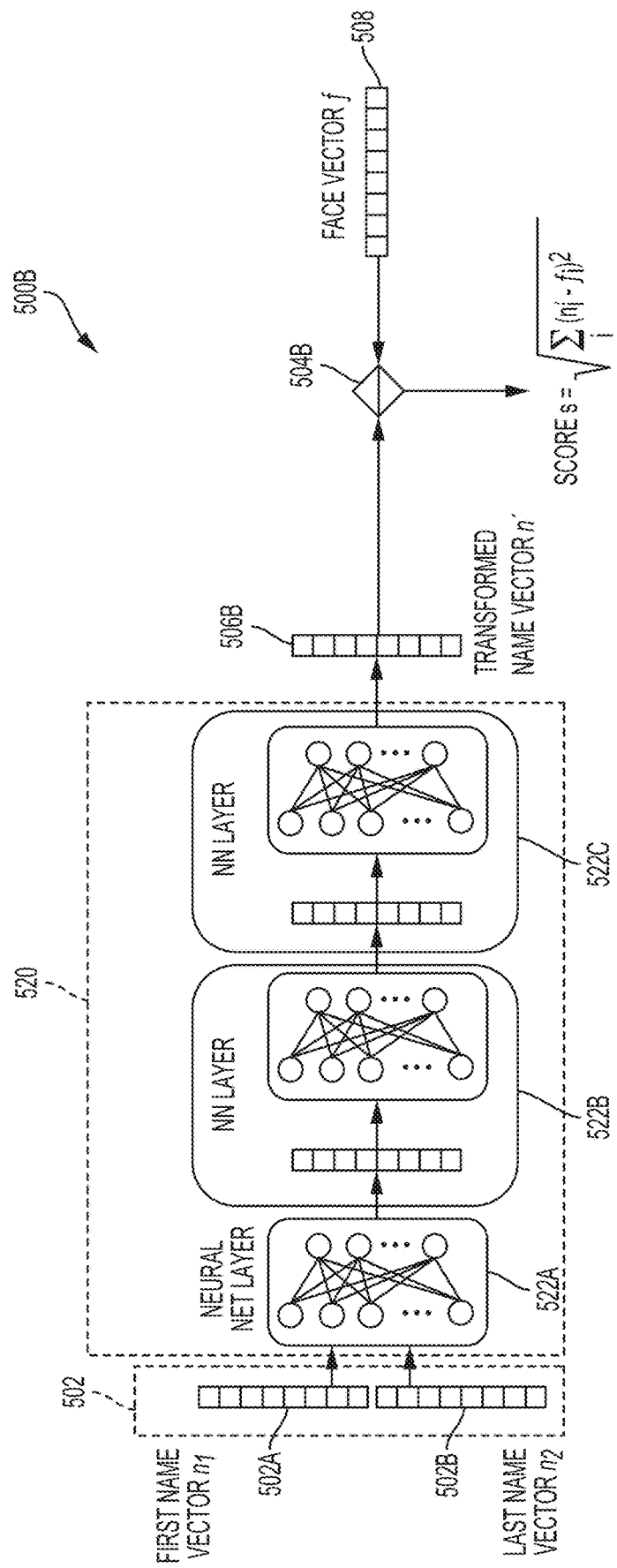

FIG. 5B illustrates a diagram 500B that shows how a selection processor (e.g., selection processor 112 of FIG. 1) can be configured to apply a fixed-width input neural net 520 to generate a similarity score 504B based on a name vector 502 (labeled n) and a face vector 508 (labeled f). In some embodiments, fixed-width input neural net 520 can be configured by matching-function trainer 106 to include a plurality of neural network layers 522A-C. In some embodiments, fixed-width input neural net 520 can be configured to include between one and five hidden layers (e.g., neural net layer 522B) such as exactly two hidden layers. In some embodiments, fixed-width input neural net 520 can be configured to include at least two hidden layers. In some embodiments, neural network layers 522A can be configured based on a sigmoid, relu, or tanh activation. The specific number of hidden layers to achieve the optimal accuracy may depend on the specific parameters of fixed-width input neural net 520 such as which type of activation is used, how name vector 502 is used, and how face vector 508 is generated during the training phase. In some embodiments, configuring fixed-width input neural net 520 with exactly two hidden layers achieved the highest accuracy when sigmoid activation is used and face vector 508 was generated based on DLIB.

In some embodiments, like affine map 510, fixed-width input neural net 520 can be configured to generate transformed name vector 506B based on name vector 502. In some embodiments, name vector 502 includes name sub-vectors 502A-B (labeled $n_1$ and $n_2$) that correspond to non-overlapping portions of a name represented by name vector 502.

In some embodiments, the selection processor can be similarly configured to calculate similarity score 504B (labeled s) based on transformed name vector 506B and face vector 508. In some embodiments, like similarity score 504A being shown in FIG. 5A, similarity score 504B can be calculated by calculating the distance (e.g., Euclidean distance) between transformed name vector 506B and face vector 508.

In some embodiments, instead of calculating the distance between transformed name vector 506B and face vector 508 to generate similarity score 504B, face vector 508 and name vector 502 can be input into fixed-width input neural net 520. In some embodiments, fixed-width input neural net 520 generates a score based on inputs of face vector 508 and name vector 502. In some embodiments, the score can be compared to a threshold score to determine whether name vector 506B is a likely match to face vector 508.

Figure 5C:
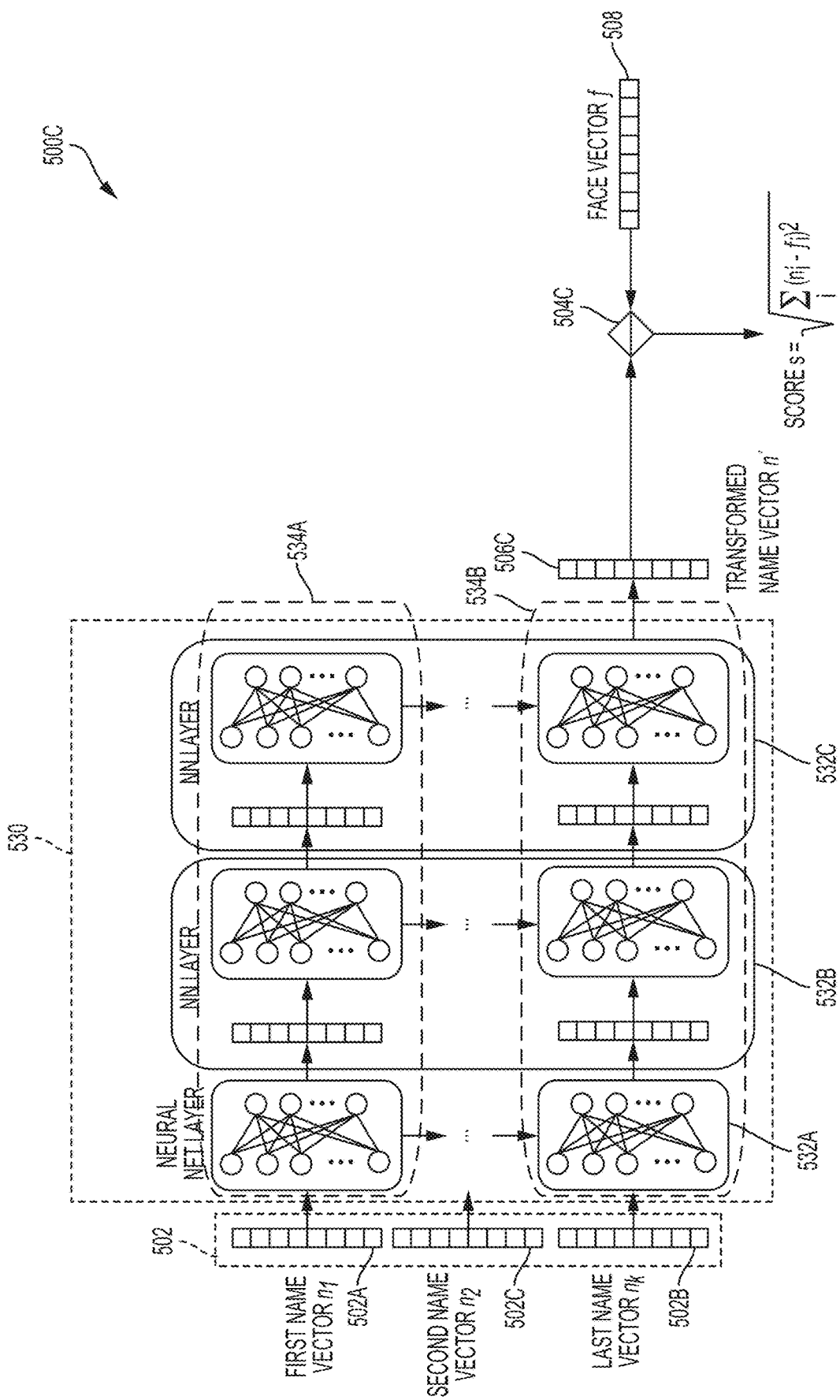

FIG. 5C illustrates a diagram 500C that shows how a selection processor (e.g., selection processor 112 of FIG. 1) can be configured to apply a Recurrent Neural Network (RNN) 530 to generate a similarity score 504C based on a name vector 502 (labeled n) and a face vector 508 (labeled f). In some embodiments, RNN 530 includes a Long Short Term Memory RNN. In some embodiments, RNN 530 can be configured by matching-function trainer 106 to include a plurality of neural network layers 532A-C. In some embodiments, RNN 530 can be configured to include at least two hidden layers (e.g., neural net layer 532B). For example, RNN 530 may be configured to include between two and five hidden layers. In some embodiments, neural network layers 522A can be configured based on a sigmoid, relu, or tanh activation. In some embodiments, RNN 530 can be configured to include a plurality of recurrent neural net timesteps 534A-B where a number of recurrent neural net layers corresponds to a number of name sub-vectors 502A-C of name vector 502. As described with respect to FIG. 5B, name sub-vectors 502A-C may correspond to non-overlapping portions of a name. For example, name sub-vectors 502A-C may correspond to a first name, a last name, and a second name, respectively.

In some embodiments, like affine map 510 and fixed-input neural net 520, RNN 530 can be configured to generate transformed name vector 506C (i.e., n') based on name vector 502. In these embodiments, RNN 530 propagates the input of name vector 502 through the plurality of neural network layers 532A-C and the recurrent neural net timesteps 534A-B to generate transformed name vector 506C. In some embodiments, each name sub-vector 502A-C can be input into a respective one of recurrent neural net timesteps 534A-B of RNN 530 to generate transformed name vector 506C. In some embodiments, the selection processor can be configured to calculate similarity score 504C (labeled s) by comparing transformed name vector 506C with face vector 508. In some embodiments, like similarity scores 504A and 504B shown in FIGS. 5A-B, similarity score 504C can be calculated by calculating the distance (e.g., a Euclidean distance) between transformed name vector 506C and face vector 508.

Figure 5D:
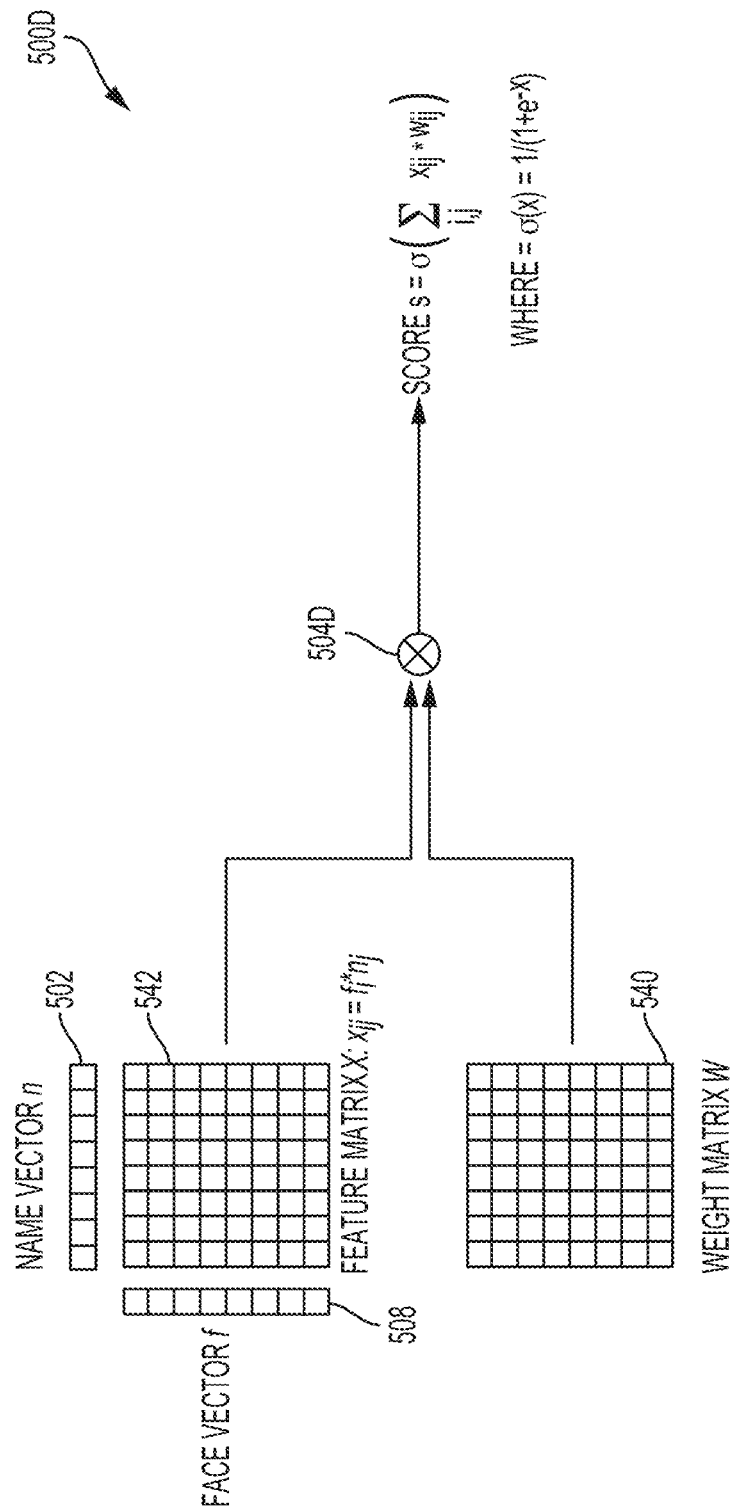

FIG. 5D illustrates a diagram 500D that shows how a selection processor (e.g., selection processor 112 of FIG. 1) can be configured to apply a LR weight matrix 540 (labeled W) to generate a similarity score 504D based on a name vector 502 (labeled n) and a face vector 508 (labeled f). In some embodiments, LR weight matrix 540 can be configured by matching-function trainer 106 based on a training dataset, as described above with respect to FIG. 3. In some embodiments, matching-function trainer 106 can configure LR weight matrix 540 as an A×B matrix where A and B correspond to the dimensionality of face vector 508 and name vector 502, respectively. In some embodiments, the selection processor can generate a feature matrix 542 (labeled X) by multiplying each element of face vector 508 with each element of name vector 502. In other words, an entry $x_{ij}$ of feature matrix 542 is computed by taking the product of the $i^{th}$ element of face vector (f) and the $j^{th}$ element of name vector (n).

In some embodiments, the selection processor can be configured to calculate similarity score 504D (labeled s) based on name vector 502 and face vector 508. In particular, to calculate the similarity score 504D, each entry of feature matrix 542 is multiplied by the corresponding entry of weight matrix 540. Then, the sum of the products can be transformed to similarity score 504D by applying the sigmoid function (i.e., $\sigma(x)=1/(1+e^{-x})$).

FIG. 6 illustrates a flowchart of a method 600 for selecting a face image based on an unknown name, according to some embodiments. Method 600 can be performed by a data-processing device such as data-processing device 102 of FIG. 1. Accordingly, one or more of the steps below may reference the components of data-processing device 102. Method 600 can be performed by processing logic that may comprise hardware (e.g., circuitry, dedicated logic, programmable logic, microcode, etc.), software (e.g., instructions running on a processing device), or a combination thereof.

In step 602, a selection processor (e.g., selection processor 112) of the data-processing device receives a name. For example, the data-processing device may include a user interface that allows a user to enter the name on an input device (e.g., a keyboard or a touchscreen). In some embodiments, the selection processor receives the name from a remote device (e.g., a mobile device or a server) operated by the user. In some embodiments, the name may include one or more of a first name, a middle name, a last name, a suffix (e.g., Jr., III, etc.), or a prefix (e.g., Mr., Mrs., or Ms.).

In step 604, a name-vector selector (e.g., name-vector selector 110) of the data-processing device selects, based on the name, a name vector from a plurality of name vectors in a dataset (e.g., name dataset 120) that maps a plurality of names to a plurality of corresponding name vectors in a vector space. In some embodiments, each name vector includes representations associated with a plurality of words associated with each name. For example, the representations may be elements (e.g., real numbers, binary numbers, integers, etc.) of the name vector. In some embodiments, the plurality of words may include a first name, a last name, a middle name, a nick name, one or more user names, or a combination thereof.

In some embodiments, the name-vector selector can be configured to query a database based on the name to retrieve the name vector. In some embodiments, the name includes a first name and a last name and the name-vector selector can be configured to select a first name vector and a last name vector from the plurality of name vectors based on the first and last name, respectively. In some embodiments, the database is configured to store associations between names and name vectors that are generated based on a word-embedding process, as described above with respect to FIGS. 1 and 2.

In step 606, a face-vector selector (e.g., face-vector selector 108) of the data-processing device receives a plurality of face vectors corresponding to a plurality of face images. In some embodiments, the face-vector selector receives the plurality of face vectors from a face-image dataset (e.g., face-image dataset 130). In some embodiments, each face vector has the same predefined number of elements.

In some embodiments, the face-image dataset can be configured to store associations between the plurality of face images and the plurality of corresponding face vectors. In some embodiments, the data-processing device can be configured to precompute the plurality of face vectors for storing in the face-image dataset before receiving the name in step 602. For example, the data-processing device may implement the Dlib algorithm to compute a face vector corresponding to a face image.

In step 608, the selection processor selects a face vector from the plurality of face vectors based on a plurality of similarity scores calculated for the plurality of corresponding face vectors. In some embodiments, for each name vector, a similarity score is calculated based on the name vector and each face vector. In some embodiments, the selection processor can be configured to select the face vector associated with the highest similarity score (e.g., the lowest distance metric) from the plurality of similarity scores. In some embodiments, the selection processor can be configured to select a matching function (e.g., affine map 142, LR weight matrix 144, or neural network 146) to calculate the plurality of similarity scores. In some embodiments, the selection of the matching function may be based on an input from the user. In some embodiments, the selection of the matching function may be based on memory, processing load, processing capability, or a combination thereof of the data-processing device. For example, an affine map (i.e., an example matching function) may be selected if the data-processing device has limited memory or processing capacity.

In some embodiments, the selection processor can be configured to relate the name vector to a transformed name vector having the same predefined number of elements as the face vector. Then, the selection processor can calculate the similarity score based on the transformed name vector and the face vector.

In some embodiments, the selection processor can be configured to select a predefined number of face vectors associated with the highest similarity scores from the plurality of similarity scores. In some embodiments where a similarity score corresponds to a distance metric (e.g., a Euclidean distance), the selection processor can be configured to select a predefined number of face vectors associated with the lowest distances. In some embodiments, the predefined number may be a default value. In other embodiments, the predefined number may be an input received from a user device.

In step 610, the selection processor outputs a face image based on the selected face vector. In some embodiments, the face image is stored in association with the face vector in a dataset such as face-image dataset 130 of FIG. 1. In some embodiments, the selection processor can be configured to output a predefined number of face images based on a predefined number of selected face vectors where the predefined number may be a default value or a user-selected value.

FIG. 7 illustrates a flowchart of a method 700 for selecting a name based on a face image, according to some embodiments. Method 700 can be performed by a data-processing device such as data-processing device 102 of FIG. 1. Accordingly, one or more of the steps below may reference the components of data-processing device 102. Method 700 can be performed by processing logic that may comprise hardware (e.g., circuitry, dedicated logic, programmable logic, microcode, etc.), software (e.g., instructions running on a processing device), or a combination thereof.

In step 702, a selection processor (e.g., selection processor 112) of the data-processing device receives a face image. For example, the data-processing device may include a user interface that allows a user to enter the face image on an input device (e.g., a keyboard or a touchscreen). In another example, the selection processor may receive the face image directly from an optical device such as a camera. In some embodiments, the selection processor receives the face image from a remote device (e.g., a mobile device or a server) operated by the user.

In step 704, a face-vector selector (e.g., face-vector selector 108) generates a face vector corresponding to the face image. In some embodiments, the face vector has a predefined number of elements. In some embodiments, the face-vector selector can be configured to apply a plurality of face-vectorization algorithms (e.g., OverFeat and Dlib) to generate a plurality of corresponding face sub-vectors. In these embodiments, the face-vector selector can be configured to concatenate the plurality of face sub-vectors to generate the face vector.

In step 706, a name-vector selector (e.g., name-vector selector 110) selects, based on a plurality of names, a plurality of name vectors from a dataset that maps the plurality of names to the plurality of corresponding name vectors. In some embodiments, each name vector includes representations associated with a plurality of words associated with each name. For example, the representations may be elements (e.g., real numbers, binary numbers, integers, etc.) of the name vector. In some embodiments, the database is configured to store associations between names and name vectors that are generated based on a word-embedding process, as described above with respect to FIGS. 1 and 2.

In step 708, the selection processor selects a name vector from the plurality of name vectors based on a plurality of similarity scores calculated for the plurality of corresponding name vectors. In some embodiments, for each name vector, a similarity score is calculated based on the face vector and each name vector. In some embodiments, the selection processor can be configured to select the name vector associated with the highest similarity score (e.g., the lowest distance metric) from the plurality of similarity scores. In some embodiments, the selection processor can be configured to select a matching function (e.g., affine map 142, LR weight matrix 144, or neural network 146) to calculate the plurality of similarity scores. In some embodiments, the selection of the matching function may be based on an input from the user. In some embodiments, the selection of the matching function may be based on memory, processing load, processing capability, or a combination thereof of the data-processing device. For example, an affine map (i.e., an example matching function) may be selected if the data-processing device has limited memory or processing capacity.

In some embodiments, the selection processor can be configured to relate the plurality of name vectors to a plurality of corresponding transformed name vectors that each has the predefined number of elements. In these embodiments, the selection processor can calculate each similarity score associated with the face image and each name vector based on the face vector and a transformed name vector corresponding to each name vector.

In some embodiments, the selection processor can be configured to select a predefined number of name vectors associated with the highest similarity scores from the plurality of similarity scores. In some embodiments where a similarity score corresponds to a distance metric (e.g., a Euclidean distance), the selection processor can be configured to select a predefined number of face vectors associated with the lowest distances. In some embodiments, the predefined number may be a default value. In other embodiments, the predefined number may be an input received from a user device.

In step 710, the selection processor outputs a name based on the selected name vector. In some embodiments, the name is stored in association with the name vector in a dataset such as name dataset 120 of FIG. 1. In some embodiments, the selection processor can be configured output a predefined number of names based on a predefined number of selected name vectors where the predefined number may be a default value or a user-selected value.

FIG. 8 illustrates an example of a computer, according to some embodiments. Computer 800 can be a component of a system for matching names and faces according to the systems and methods described above, such as system 100 of FIG. 1, or can include the entire system itself. In some embodiments, computer 800 is configured to execute a method for selecting a face image based on a name or vice versa, such as methods 600 and 700 of FIGS. 6 and 7, respectively.

Computer 800 can be a host computer connected to a network. Computer 800 can be a client computer or a server. As shown in FIG. 8, computer 800 can be any suitable type of microprocessor-based device, such as a personal computer, workstation, server, or handheld computing device, such as a phone or tablet. The computer can include, for example, one or more of processor 810, input device 820, output device 830, storage 840, and communication device 860. Input device 820 and output device 830 can correspond to those described above and can either be connectable or integrated with the computer.

Input device 820 can be any suitable device that provides input, such as a touch screen or monitor, keyboard, mouse, or voice-recognition device. Output device 830 can be any suitable device that provides an output, such as a touch screen, monitor, printer, disk drive, or speaker.

Storage 840 can be any suitable device that provides storage, such as an electrical, magnetic, or optical memory, including a random access memory (RAM), cache, hard drive, CD-ROM drive, tape drive, or removable storage disk. Communication device 860 can include any suitable device capable of transmitting and receiving signals over a network, such as a network interface chip or card. The components of the computer can be connected in any suitable manner, such as via a physical bus or wirelessly. Storage 840 can be a non-transitory computer-readable storage medium comprising one or more programs, which, when executed by one or more processors, such as processor 810, cause the one or more processors to execute methods described herein, such as methods 600 and 700 of FIGS. 6 and 7, respectively.

Software 850, which can be stored in storage 840 and executed by processor 810, can include, for example, the programming that embodies the functionality of the present disclosure (e.g., as embodied in the systems, computers, servers, and/or devices as described above). In some embodiments, software 850 can include a combination of servers such as application servers and database servers.

Software 850 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method of selecting a face image based on a name, comprising:
   receiving a name;
   selecting, based on the name, a name vector from a plurality of name vectors in a dataset that maps a plurality of names to a plurality of corresponding name vectors in a vector space, wherein each name vector comprises representations associated with a plurality of words associated with each name, wherein the plurality of name vectors are position vectors;
   receiving a plurality of face vectors corresponding to a plurality of face images;
   selecting a face vector from the plurality of face vectors based on a plurality of similarity scores calculated for the plurality of corresponding face vectors, wherein for each name vector, a similarity score is calculated based on the name vector and each face vector; and
   outputting a face image based on the selected face vector.

2. The method of claim 1, wherein the representations are generated by word embedding each plurality of words associated with each name of the plurality of names.

3. The method of claim 2, wherein a first plurality of words comprises a first word and a second word, wherein a second plurality of words comprises a third word, and wherein the word embedding generates two name vectors corresponding to the first and second words that are closer in the vector space than two vectors generated for the corresponding first and third words.

4. The method of claim 1, wherein each face vector of the plurality of face vectors comprises a predefined number of elements, and wherein the method comprises:
   relating the name vector to a transformed name vector having the predefined number of elements; and
   calculating a similarity score between the name vector and the face vector based on the transformed name vector and the face vector.

5. The method of claim 4, wherein relating the name vector to the transformed name vector comprises:

using an affine map to generate the transformed name vector based on the name vector.

6. The method of claim 4, wherein relating the name vector to the transformed name vector comprises:
using a neural network comprising at least two layers to generate the transformed name vector based on the name vector.

7. The method of claim 4, wherein calculating the similarity score between the name vector and the face vector comprises:
calculating a Euclidean distance between the transformed name vector and the face vector.

8. The method of claim 1, wherein the name vector comprises a first predefined number of elements and the face vector comprises a second predefined number of elements, and wherein selecting the face vector comprises:
receiving a weight matrix having a first and a second dimension that correspond to the first and the second predefined number of elements, respectively, wherein the weight matrix comprises precomputed values;
generating a feature matrix by multiplying the name vector with the face vector; and
calculating a similarly score between the name vector and the face vector based on the weight matrix and the feature matrix.

9. The method of claim 1, comprising:
for each user account from a plurality of user accounts, receiving a plurality of user names associated with each user account; and
inputting the plurality of user names associated with each user account into a word-embedding algorithm to generate the mapping of the plurality of names to the plurality of corresponding name vectors, wherein the plurality of names corresponds to the plurality of user names.

10. The method of claim 9, wherein the word-embedding algorithm comprises one of word2vec, GloVe, or FastText.

11. The method of claim 1, wherein the name comprises a first name and a last name, and wherein the method comprises:
searching the first name in the dataset to select a first name vector from the plurality of name vectors; and
searching the last name in the dataset to select a last name vector from the plurality of name vectors.

12. The method of claim 11, comprising:
relating a concatenation of the first and last name vectors to a transformed name vector; and
calculating a similarity score between the name vector and the face vector based on the transformed name vector and the face vector.

13. The method of claim 1, comprising:
receiving a parameter associated with the name;
selecting a matching function from a plurality of matching functions based on the parameter; and
calculating the plurality of similarity scores based on the matching function.

14. The method of claim 13, wherein the parameter comprises one or more of: a gender, an age range, an ethnicity, a nationality, an eye color, or a hair color.

15. A system for selecting a face image based on a name, comprising:
one or more processors and memory storing one or more programs that when executed by the one or more processors cause the one or more processors to:
receive a name;
select, based on the name, a name vector from a plurality of name vectors in a dataset that maps a plurality of names to a plurality of corresponding name vectors in a vector space, wherein each name vector comprises representations associated with a plurality of words associated with each name, wherein the plurality of name vectors are position vectors;
receive a plurality of face vectors corresponding to a plurality of face images;
select a face vector from the plurality of face vectors based on a plurality of similarity scores calculated for the plurality of corresponding face vectors, wherein for each name vector, a similarity score is calculated based on the name vector and each face vector; and
output a face image based on the selected face vector.

16. The system of claim 15, wherein the representations are generated by word embedding each plurality of words associated with each name of the plurality of names.

17. The system of claim 16, wherein a first plurality of words comprises a first word and a second word, wherein a second plurality of words comprises a third word, and wherein the word embedding generates two name vectors corresponding to the first and second words that are closer in the vector space than two vectors generated for the corresponding first and third words.

18. The system of claim 15, wherein each face vector of the plurality of face vectors comprises a predefined number of elements, and wherein the one or more processors are caused to:
relate the name vector to a transformed name vector having the predefined number of elements; and
calculate a similarity score between the name vector and the face vector based on the transformed name vector and the face vector.

19. The system of claim 18, wherein to relate the name vector to the transformed name vector, the one or more processors are caused to:
use an affine map to generate the transformed name vector based on the name vector.

20. The system of claim 18, wherein to relate the name vector to the transformed name vector, the one or more processors are caused to:
use a neural network comprising at least two layers to generate the transformed name vector based on the name vector.

21. The system of claim 18, wherein to calculate the similarity score between the name vector and the face vector, the one or more processors are caused to:
calculate a Euclidean distance between the transformed name vector and the face vector.

22. The system of claim 15, wherein the name vector comprises a first predefined number of elements and the face vector comprises a second predefined number of elements, and wherein to select the face vector, the one or more processors are caused to:
receive a weight matrix having a first and a second dimension that correspond to the first and the second predefined number of elements, respectively, wherein the weight matrix comprises precomputed values;
generate a feature matrix by multiplying the name vector with the face vector; and
calculate a similarly score between the name vector and the face vector based on the weight matrix and the feature matrix.

23. The system of claim 15, wherein the one or more processors are caused to:

for each user account from a plurality of user accounts, receive a plurality of user names associated with each user account; and input the plurality of user names associated with each user account into a word-embedding algorithm to generate the mapping of the plurality of names to the plurality of corresponding name vectors, wherein the plurality of names corresponds to the plurality of user names.

24. The system of claim 23, wherein the word-embedding algorithm comprises one of word2vec, GloVe, or FastText.

25. The system of claim 15, wherein the name comprises a first name and a last name, and wherein the one or more processors are caused to:

search the first name in the dataset to select a first name vector from the plurality of name vectors; and search the last name in the dataset to select a last name vector from the plurality of name vectors.

26. The system of claim 25, wherein the one or more processors are caused to:

relate a concatenation of the first and last name vectors to a transformed name vector; and calculate a similarity score between the name vector and the face vector based on the transformed name vector and the face vector.

27. The system of claim 15, wherein the one or more processors are caused to:

receive a parameter associated with the name;

select a matching function from a plurality of matching functions based on the parameter; and calculate the plurality of similarity scores based on the matching function.

28. The system of claim 27, wherein the parameter comprises one or more of: a gender, an age range, an ethnicity, a nationality, an eye color, or a hair color.

* * * * *